US012083538B2

(12) United States Patent
Gay et al.

(10) Patent No.: US 12,083,538 B2
(45) Date of Patent: Sep. 10, 2024

(54) ELECTROSTATIC AIR FILTER

(71) Applicant: Darwin Technology International Limited, Skelmersdale (GB)

(72) Inventors: Geoffrey Norman Walter Gay, Skelmersdale (GB); George Griffiths, Skelmersdale (GB)

(73) Assignee: DARWIN TECHNOLOGY INTERNATIONAL LIMITED, Skelmersdale (GB)

( * ) Notice: Subject to any disclaimer, the term of this patent is extended or adjusted under 35 U.S.C. 154(b) by 470 days.

(21) Appl. No.: 17/612,813

(22) PCT Filed: May 18, 2020

(86) PCT No.: PCT/GB2020/000050
§ 371 (c)(1),
(2) Date: Nov. 19, 2021

(87) PCT Pub. No.: WO2020/234553
PCT Pub. Date: Nov. 26, 2020

(65) Prior Publication Data
US 2022/0219177 A1      Jul. 14, 2022

Related U.S. Application Data

(60) Provisional application No. 62/850,604, filed on May 21, 2019.

(51) Int. Cl.
*B03C 3/47* (2006.01)
*B03C 3/02* (2006.01)
(Continued)

(52) U.S. Cl.
CPC ............... *B03C 3/47* (2013.01); *B03C 3/025* (2013.01); *B03C 3/08* (2013.01); *B03C 3/64* (2013.01)

(58) Field of Classification Search
CPC .. B03C 3/47; B03C 3/025; B03C 3/08; B03C 3/64; B03C 3/86; B03C 3/12; B03C 3/38;
(Continued)

(56) References Cited

U.S. PATENT DOCUMENTS 2,948,353 A    8/1960   Penney
4,166,729 A    9/1979   Thompson et al.
(Continued)

FOREIGN PATENT DOCUMENTS

CN    101585015 A    11/2009
CN    203916909 U    11/2014
(Continued)

OTHER PUBLICATIONS

Office Action for Chinese Patent Application No. 202010437378.3, dated Jan. 29, 2022, and partial English translation.
(Continued)

*Primary Examiner* — Robert A Hopkins
*Assistant Examiner* — Qianping He
(74) *Attorney, Agent, or Firm* — Renner, Otto, Boisselle & Sklar, LLP

(57) ABSTRACT

A filter for an electrostatic precipitator comprising: a plurality of spaced-apart, electrode films having electrical conductivity, arranged to be alternately powered at high and low electrical potentials, each of said electrode films having a leading edge, a trailing edge and two opposing side edges therebetween that extend in the direction of airflow; and first and second pluralities of spaced-apart, rigid isolation members bonded to each of the leading and trailing edges of the plurality of electrode films respectively, wherein each isolation member is bonded, via a substantially continuous, preferably flat, surface thereof, to at least some of said leading or trailing edges, thereby fixing the electrode films in the required spaced-apart arrangement thereof.

27 Claims, 21 Drawing Sheets

(51) Int. Cl.
*B03C 3/08* (2006.01)
*B03C 3/64* (2006.01)

(58) Field of Classification Search
CPC ......... B03C 3/66; B03C 3/60; B03C 2201/10; B03C 3/41; B03C 3/62; B03C 3/84; B01C 3/41
USPC .................................... 95/57–81; 96/15–100
See application file for complete search history.

(56) References Cited

U.S. PATENT DOCUMENTS

| | | |
|---|---|---|
| 4,313,741 A | 2/1982 | Senichi et al. |
| 4,861,356 A | 8/1989 | Penney |
| 5,766,318 A | 6/1998 | Loreth et al. |
| 6,506,238 B1 * | 1/2003 | Endo .................. B03C 3/12 96/87 |
| 2017/0120257 A1 | 5/2017 | Yanghwa et al. |
| 2019/0381516 A1 * | 12/2019 | Marra .................. B03C 3/08 |

FOREIGN PATENT DOCUMENTS

| | | |
|---|---|---|
| CN | 106944260 A | 7/2017 |
| CN | 207357356 U | 5/2018 |
| JP | 2004-174456 A | 6/2004 |
| JP | 2005111400 A | 4/2005 |
| WO | 2018/162792 A1 | 9/2018 |
| WO | 2019098526 A2 | 5/2019 |

OTHER PUBLICATIONS

International Search Report for PCT/GB2020/000050 mailed Jul. 22, 2020.

* cited by examiner

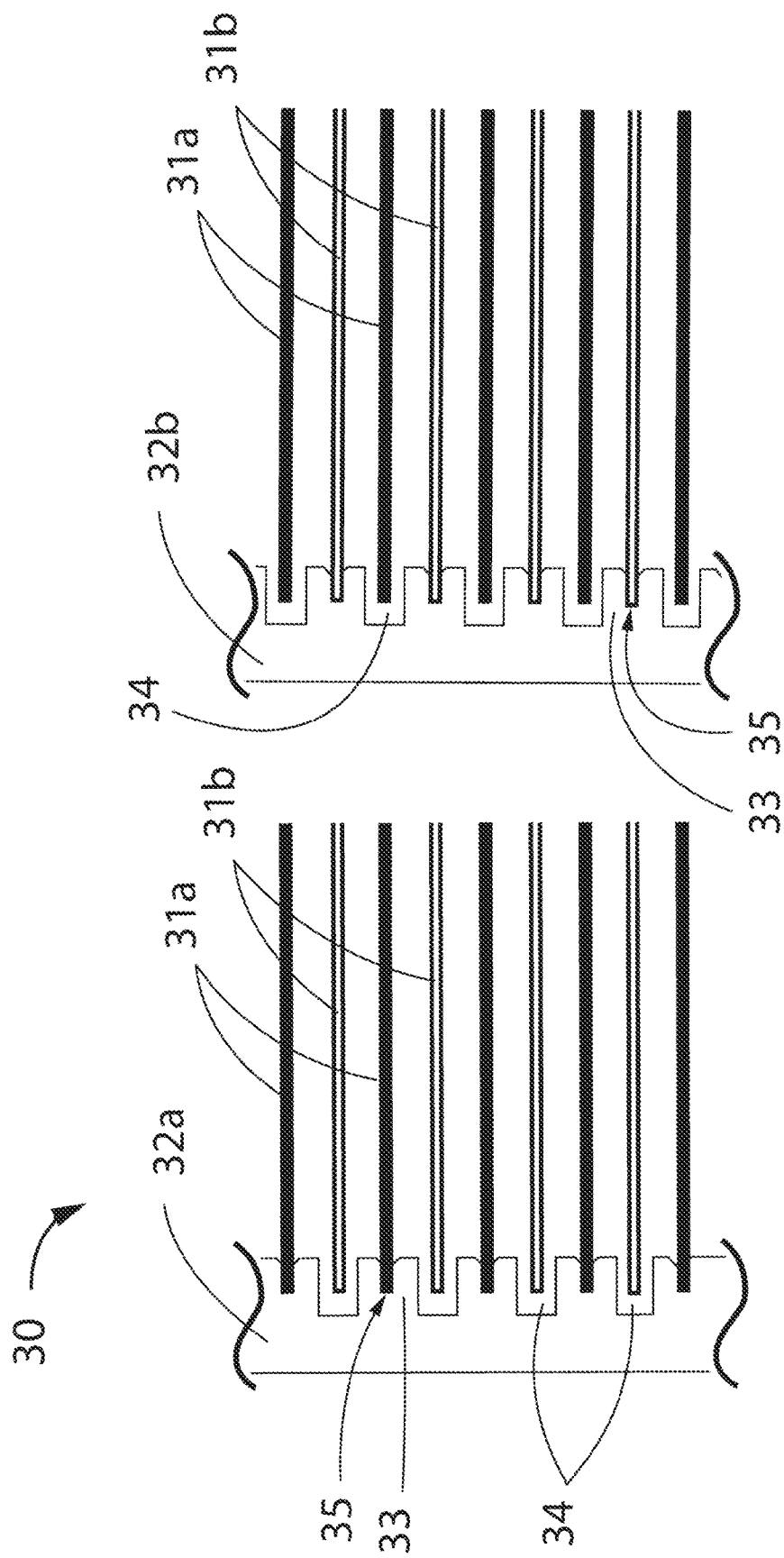

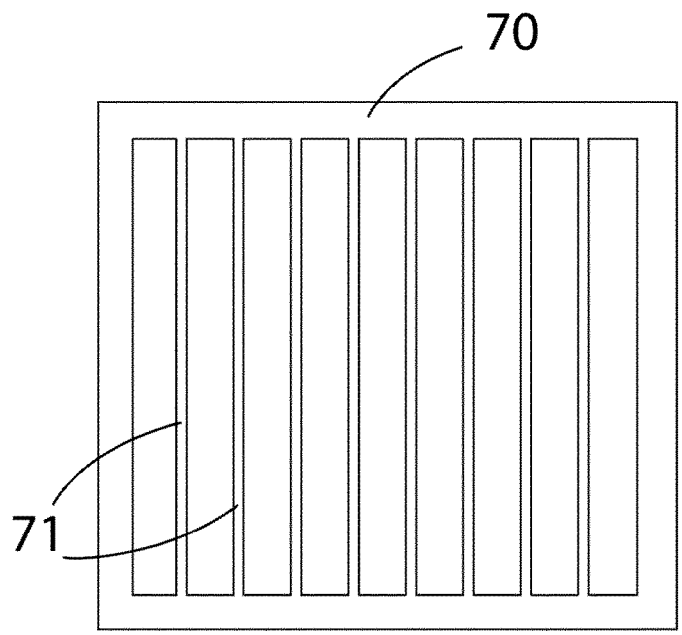
FIG 7A
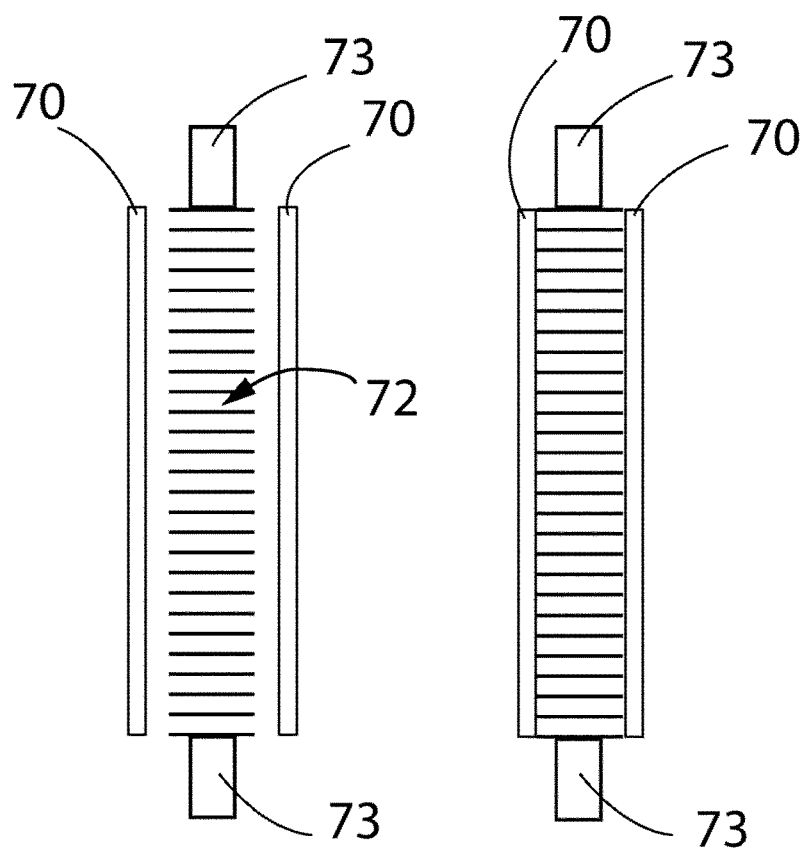
FIG 7B     FIG 7C

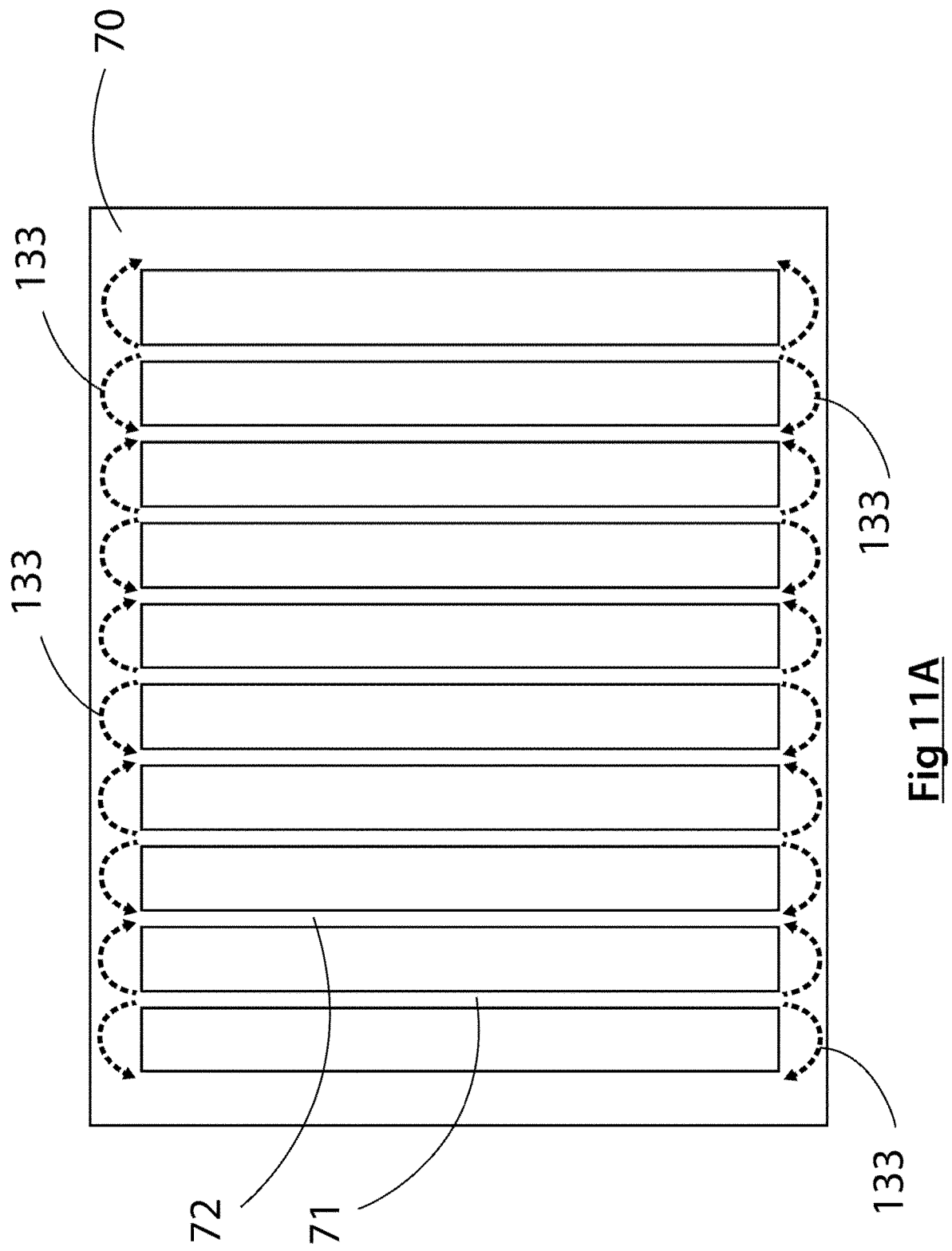

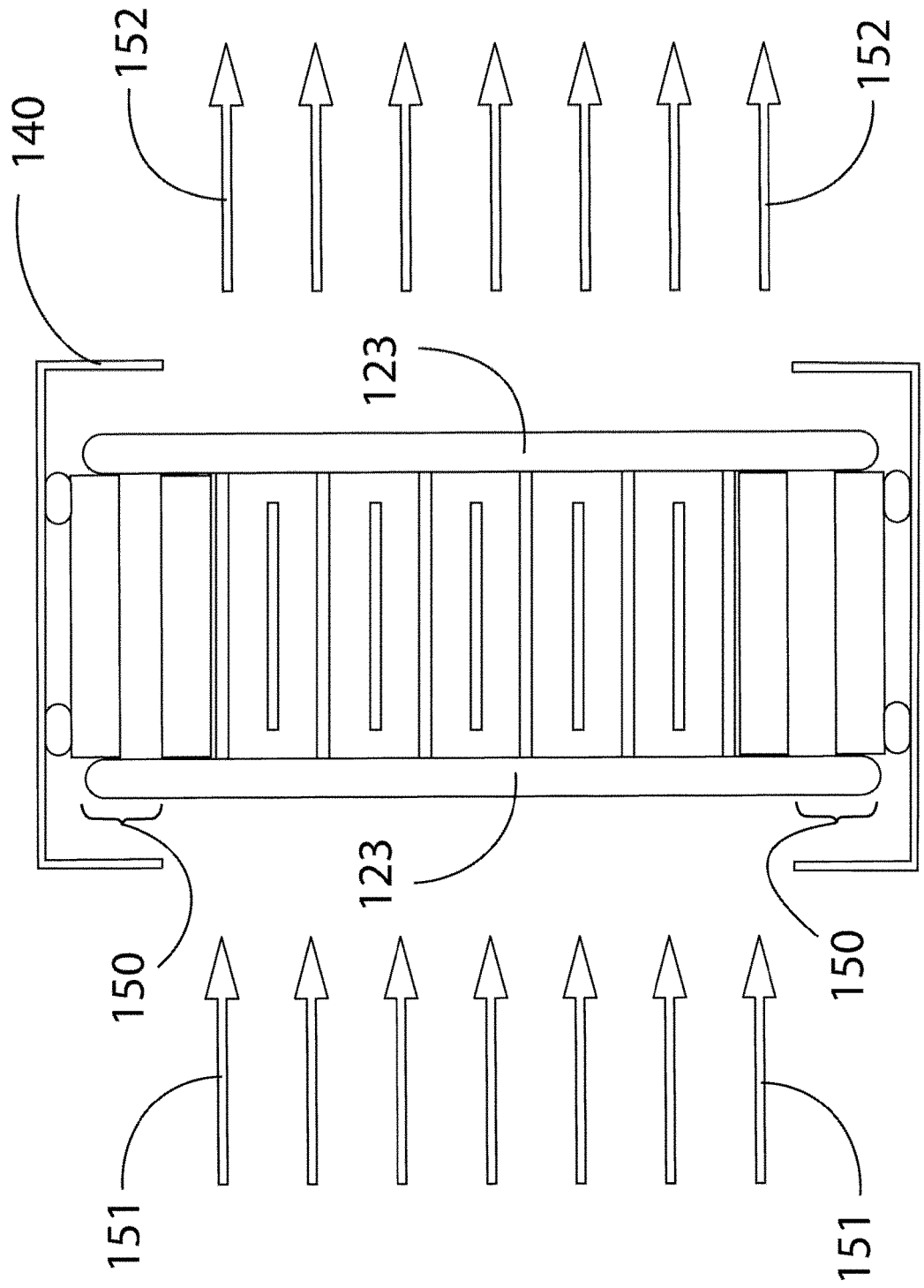

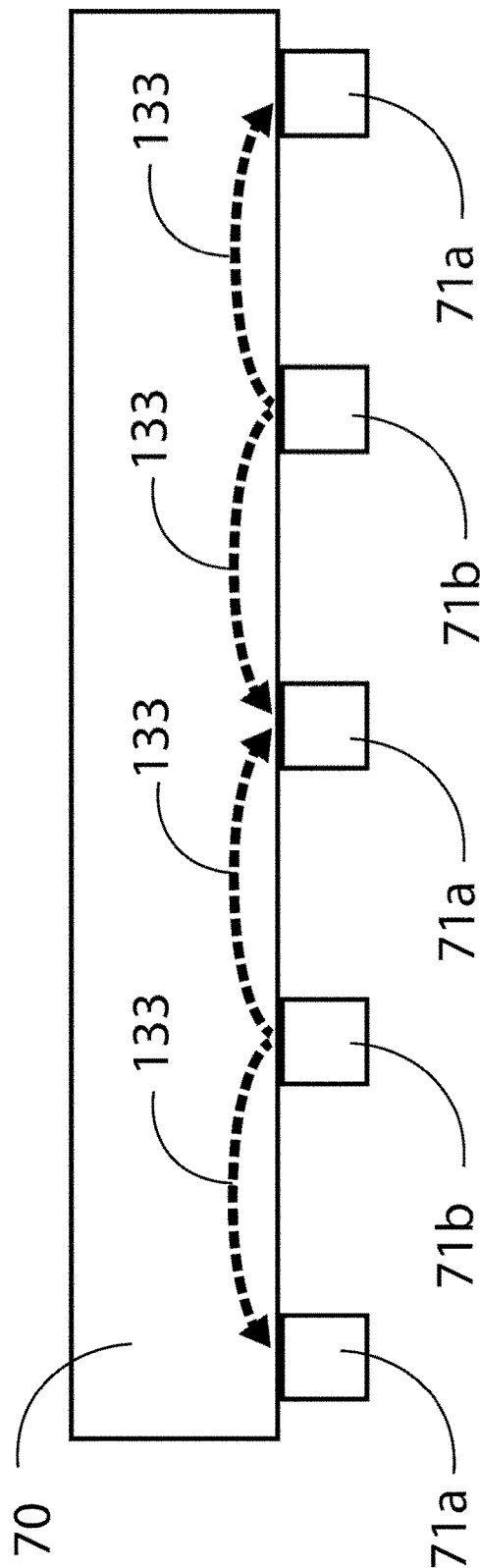
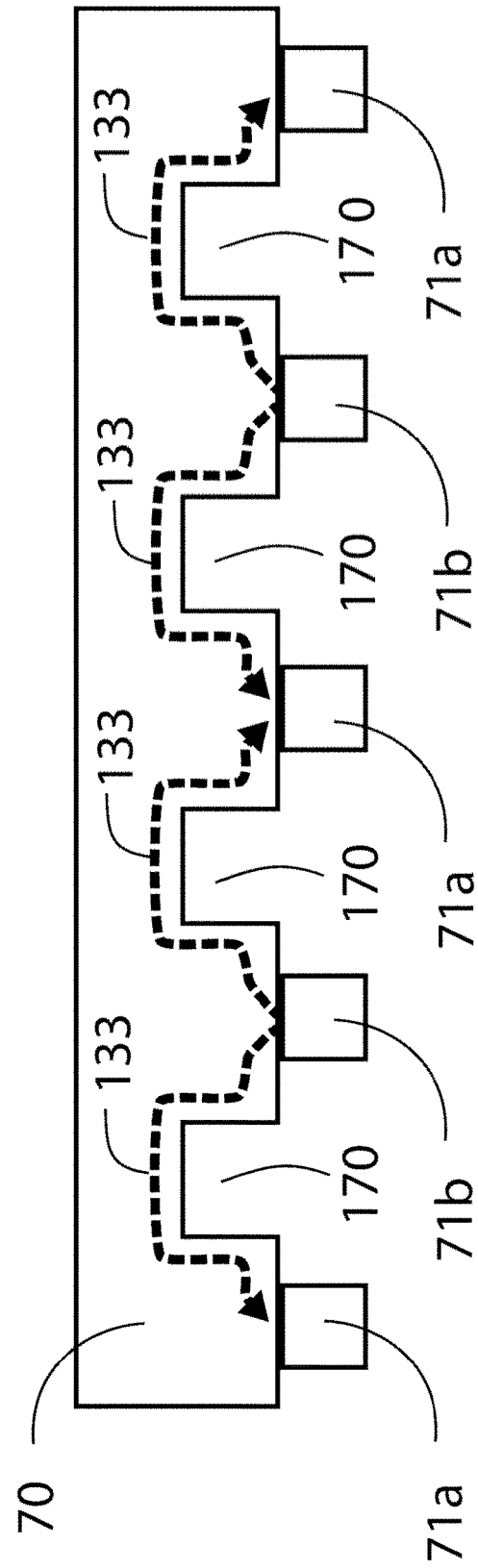
Fig 13A
Fig 13B

ELECTROSTATIC AIR FILTER

This application is a national phase of International Application No. PCT/GB2020/000050 filed May 18, 2020, which claims priority to U.S. of America Application No. 62/850,604 filed May 21, 2019, the entire disclosures of which are hereby incorporated by reference.

This invention is directed to a filter, the operation and design of which is based on electrostatic precipitation principles, and, in particular to an air filter suitable for use in an electrostatic precipitator.

Electrostatic precipitators are available in various sizes and shapes and are used across a wide spectrum of industrial, commercial and domestic applications. For example, in industry they are used to remove suspended particles from the hot waste gases of coal-fired power stations. Across a broad range of the chemical industry, they are used to clean hot and cold gas streams. Most commercial and all domestic applications of electrostatic precipitators are used to clean ambient air of undesirable 'contaminant' particles.

As is well known in the art, there are two stages of an electrostatic precipitator. In the first stage or section, contaminant or other undesirable particles in an air stream are electrically charged. In the second stage or section, some of said charged particles are captured using an appropriate filter and thus removed from the air stream. The level of capture of charged particles defines the efficiency of the precipitator and may typically range from 80% to 99.9%, with these higher efficiencies being achievable in environments in which any space restraints for location of the precipitator are few or non-existent, e.g. in a coal-fired power station chimney.

The second stage or section of an electrostatic precipitator typically comprises a group of parallel conductive plates (electrodes) designed to capture charged particles. Alternative ones of said plates are usually arranged so as to be operated at comparatively high and low electrical potential. Low potential plates are usually at ground potential and thus are often referred to as 'ground plates' or 'ground electrodes'. By way of example, if the high potential plates are powered at, e.g. +6 kV, and the low potential plates are held at ground potential (0 kV), positively charged particles in an air stream passing through between the plates will, by virtue of the electrical field, be attracted to and move towards the adjacent ground plates where they will be captured. The positive charge on said captured particles will transfer to the ground plates and flow as part of the electrical circuit.

As is well known in the art, the efficiency of removal of charged particles using an electrostatic precipitator is a function of a number of variables, including:
(1) the amount of charge on the particles;
(2) the size of the particles;
(3) the electric field strength between the plates;
(4) the velocity of the air that is flowing through the plates;
(5) the depth of the plates measured in the direction of the airflow;
(6) the distance between adjacent, oppositely charged plates.

Theoretically, a very high efficiency (of the order of 99.9%) can be achieved by suitable alteration of these variables.

In practice, high efficiency particle filtration is desirable for many applications. For example, the outside air in many major cities of the world often contains respirable fine particles of carbon, which results from the incomplete combustion of fuel in vehicles travelling around. This outside air can cause respiratory problems for people moving about the city, but it can also infiltrate houses, apartments and other residences, as well as places of work.

Circulating air in commercial buildings and offices often needs to be conditioned in order to keep temperatures at comfortable levels. Furthermore, levels of carbon dioxide, odours and volatile organic compounds from people and equipment within the buildings accumulate, and 'fresh air' needs to be introduced from the outside to keep these pollutants at a low level. However, this 'fresh air' is often loaded with harmful particulates, particularly so in the aforementioned major cities, and so it is important to clean such air before it is introduced into the circulating air conditioning system.

In general, in buildings with human occupancy, removal of health-harming particles from respirable air is desirable at 99% efficiency and higher. Although theoretically possible, in practice, there are limits to achievable high efficiency in such environments, often with a small filter depth in the direction of airflow being one such constraint.

By way of example, a typical electronic air cleaner using electrostatic precipitation principles situated within a domestic ducted air conditioning system (such as may be found in the USA) would be subjected to air velocity of typically 1 to 3 m/s. Such a system has a filter comprising metal plates as electrodes, which are spaced about 5 mm apart, and a voltage of about 6 kV may be applied across the plates in use. The depth of the plates in the direction of airflow is about 75 mm. Such a system provides a filter efficiency of only 90% at 0.3 micron particle diameter, i.e. 'low' efficiency.

A further example is that of a 'mini-split' or 'high-wall' air conditioning system where an electrostatic precipitation filter operating at 1.5 m/s air velocity, with a space constraint in terms of maximum filter depth in the direction of airflow is 15 mm or less, again results in similarly 'low' efficiencies of typically 90%.

To increase such 'low' efficiencies, reverting in turn to each of the efficiency variables discussed above:
(1) The charge on the particles could be increased by providing a higher voltage and current on the charging electrodes. However, any increase by this means would be only marginal in terms of improved efficiency and the increase in toxic ozone would be undesirable.
(2) With regard to the size of the particles, in practice there is usually no control over this and efficiency measurements usually target the most difficult particle size to capture, typically about 0.3 microns diameter.
(3) The applied voltage could be increased beyond 6 kV, which would increase the field strength and hence the efficiency. However, increasing the voltage could cause electrical arc breakdown between the plates, especially at the plate edges where the field strength is most intense.
(4) Regarding air velocity, the constraints are usually dictated by the air conditioning system. Thus, even though 'high' efficiencies can be achieved at lower air velocities, this option is not currently viable as the system operates at an air velocity predetermined by the air conditioning design.
(5) Increasing the depth of the plates in the direction of airflow would improve efficiency significantly, for example an increase in depth in the above ducted air conditioning system from 75 mm to 150 mm could increase efficiency to a desirable value of 99%, but problems would ensue. Firstly, the depth of the filter per se would double which would likely make the filter unusable due to system size constraints. Secondly, in air conditioning systems employed in spaces of human occupation, there is typically a constraint placed on available space in which to deploy an air filter, and 'small' filter depths of 25 mm or less allow the inclusion of such filters without extensive product redesign. Thirdly, the weight of the metal plates filter would double, which would also mean an increase in the cost of the filter materials.

(6) The distance between the plates could be decreased to achieve a desirable 99% efficiency value, which could be halved to 2.5 mm in the above ducted air conditioning system. With this distance, and maintaining the applied voltage at 6 kV, it is however likely there would be a problem of arcing; the voltage would need to be reduced to, e.g. 3 kV, thus maintaining the original field strength between plates. Furthermore, due to shorter particle-to-plate distances, although such an arrangement might lead to the desired percentage efficiency, constructing such an arrangement would involve assembling twice as many metal plates, which would be costly in terms of assembly time. Moreover, the finished filter would be twice as heavy and also bear an increased materials cost. Also, with a higher spatial density of plates, the pressure drop through the filter would be higher.

As noted earlier in this specification, electrostatic precipitators are used across a wide spectrum of industrial, commercial and domestic applications, each of which requires different methods for isolation of the electrode plates.

Electrical isolation between the two sets of plates, high potential and ground, is very important in the functioning of an electrostatic precipitator. Any significant leakage of current between the two sets of plates will result in a decrease of voltage between the plates, causing a fall in particle capture efficiency. (This is because the voltage is provided by a high voltage generator which has inherent internal resistance. As the leakage current increases, the terminal voltage of the high voltage generator will fall due to the voltage drop across the internal resistance. However, if the high voltage generator is voltage stabilised then the power consumption will rise as the leakage current rises requiring a more expensive power supply design and when the maximum deliverable current is reached, the voltage will drop or trigger-off reducing the filter efficiency.)

There are two principal causes of current leakage in an electrostatic precipitator.

The first is due to leakage current along the surfaces which connect the two sets of different polarity plates. This current depends on the voltage between the plates, the length of the leakage distance and conductivity of the surface film through which the current passes. As 'dirty' air flows through the electrostatic precipitator, it is inevitable that, with time, dirt, such as dust particles and other debris, will build on these surfaces. Most dirt has a significant conductivity, meaning that the leakage current will increase as the deposited dirt builds up on the surfaces. Another factor that contributes to an increase in conductivity is water. The dirt deposited is subjected to air with a varying humidity. At high humidity, the dirt film becomes considerably more conductive due to absorption of water from humid air passing over it, which also increases leakage current, reduces the voltage across the plates and hence reduces filter efficiency.

The second is due to corona discharge. Provided a minimum distance is maintained between the plates according to the operating voltage, when new and clean there is little or no corona discharge between the plates. As the collector plates accumulate dirt, then corona discharge can take occur from raised features in the collections of deposited dirt, which increase local electric field strength to a point that ignites a corona discharge. As the plates become dirtier, this current can increase to the extent that the plates will need to be periodically washed clean. Deposits of dirt on the leading edge of the plates are a particular problem because the field strength on the plate edges is often higher than between the plates. Corona discharge on these edges increases leakage current further. The effect of the corona is also to emit ions of the opposite polarity to the charged dirt particles, and subsequent collision between the two tends to reduce or remove the particle charge, thus reducing efficiency.

FIG. 1A illustrates a prior art filter 10 that suffers from each of these two principal causes of leakage. Filter 10 comprises collector plates (electrodes) 11, split into two alternating groups: those arranged to be powered at high potential 11*a* and those arranged to be powered at low (or ground) potential 11*b*. Collector plates 11 are held in grooves or slots 12 in the insulating material of the walls 13 of the filter. The suspended plates 11 must be stiff or rigid enough, as well as thick enough, to bridge the gap G between the walls 13 without deforming when high voltages are applied to them; consequently, such suspended plates are typically made of metal of thickness of at least 0.2 mm for a typical gap G of 150 mm. The leakage current along the surfaces is dependent on the distance D between the plates 11 at the walls 13 and the amount of dirt (not shown) deposited on the walls 13.

To reduce the likelihood of current leakage by corona emission at the edges of the plates 11 that are held in the slots 12 in the walls 13 of a filter such as that shown in FIG. 1A, a common method is to "step" or shift the relative positions of the high-voltage set 11*a* and the ground set 11*b* of plates. This is shown in FIG. 1B. Because the distance between the edges 14*a* of the high potential plates 11*a* and the edges 14*b* of the ground plates 11*b* is greater than would be the case if the two sets of plates were all aligned one on top of the other (as is shown in FIG. 1A), the field strength at said edges is less.

Other alternative methods of reducing leakage current by corona at the plate edges are also known, including that described by Loreth et al. in U.S. Pat. No. 5,766,318.

Another standard filter design used in a household/commercial electrostatic precipitator is shown in FIGS. 2A, 2B and 2C. Filter 20 comprises metal plates (electrodes) 21, split into two alternating groups: those plates 21*a* arranged to be powered at (high voltage) and those plates 21*b* arranged to be powered at low (or ground) voltage. Both set of plates 21*a*, 21*b* are provided with two different sizes of holes—large L and small S—arranged at regular intervals around the periphery thereof. The holes are arranged such that a large hole L in plate 21*a* corresponds with a small hole S in plate 21*b*, and vice versa; the holes in all plates 21, when said plates are aligned, are in register with one another. A series of metal rods 22 are secured into an insulating base plate 23, which is of the same area dimensions as the collector plates 21.

The distance between pairs of adjacent metal rods 22 along the long edges of the plates 21 is approximately 125 mm. This relatively large distance is possible because of the rigidity of the metal plates 21, which are approximately 0.5 mm to 1.0 mm in thickness. A distance longer than 125 mm between pairs of adjacent metal rods 22 would allow the plates 21 to bow under their own weight. This would not be acceptable because the structure of the overall filter 20 would be unstable and would not support the electrical forces between the plates 21, in which case the distance between plates 21 might reduce to the point that corona or other discharge occurs, or the plates may even touch causing a short circuit.

The 'in register' arrangement of the alternating large L and small S holes in the collector plates 21a, 21b allow the plates to be assembled one by one over the rods 22. Each plate 21a, 21b is supported using a series of spacers, e.g. metal spacers, 24 which are of a diameter such that they do not pass through the small holes S, but do pass through the large holes L without making contact with the circumference of the large holes L, thus avoiding contact with the opposite polarity plate(s). The first plate 21b is separated from the insulating base plate 23 in the same manner, i.e. using a series of spacers 24. Such an overall configuration means that the two sets of plates 21a, 21b are separated both mechanically and electrically. The separation distance between adjacent metal plates 21 of filter 20 is in the region of 7 mm; the depth of the plates 21 in the direction of airflow (shown by the arrow in FIG. 2C) is typically 75 mm, giving a filtration efficiency of 90% at 0.3 micron particle diameter.

FIGS. 2A and 2B show only three collector plates 21 for clarity, however, a person skilled in the art will appreciate that, in practice, a filter will have many plates, as partly illustrated in FIG. 2C, all assembled in the same manner as described with reference to FIGS. 2A and 2B.

An alternative, known method of collector plate isolation is shown in the filter 30 of FIGS. 3A and 3B. Filter 30 comprises collector plates (electrodes) 31, split into two alternating groups: those arranged to be powered at high potential 31a and those arranged to be powered at low (or ground) potential 31b. Components formed from an insulating material (e.g. a plastics material) and having a comb-like structure 32a, 32b, i.e. having individual 'teeth' 33 with gaps 34 therebetween, individually support either the high voltage plates 31a or the ground plates 31b along one face of the filter 30. It will be seen from FIGS. 3A and 3B that the 'combs' 32a, 32b are of identical profile but displaced by half of one comb tooth pitch from each other, so that the 'comb' 32a shown in FIG. 3A supports and spaces the high voltage plates 31a only and 'comb' 32b shown in FIG. 3B supports and spaces the ground plates 31b only. In both cases, the teeth 33 of the 'combs' 32a, 32b are provided with a recess 35 at the tip thereof to grip the plate being supported, whilst the adjacent gaps 34 accommodate— without making contact with—the alternating plates.

Thus, FIG. 3A shows the high voltage plates 31a being gripped and supported by recesses 35 in the teeth 33 of 'comb' 32a, whilst the ground plates 31b are electrically isolated and physically separated by the accommodating gaps 34 adjacent to the teeth 33. Similarly, the ground plates 31b are gripped and supported by recesses 35 in the teeth 33 of one or more adjacent 'combs' 32b, whilst the high voltage plates 31a are electrically isolated and physically separated by the accommodating gaps 34 adjacent to the teeth 33. Therefore the collector plates 31 are kept topologically and electrically separate reducing the leakage current. It will be readily understood by a person skilled in the art that these two variations of 'comb' 32a, 32b can be multiplied and placed alternately across the face of the filter 30 to support the plates 31 across the full width of the filter 30. It will also be readily understood that similar sets of combs would be placed across the opposite face of the filter to provide complete support to the high voltage and earth plates.

This particular method of plate isolation, i.e. use of 'combs', works well down to a plate separation distance of 2 mm. However, at distances less than 2 mm major diffi- culties are encountered. Firstly, the plastic 'comb' will need to be moulded in a thinner plastic material, so as not to interfere with or touch the other set of plates. As a result, the inherent strength of the 'comb' is reduced, such that it cannot adequately support the plates. Secondly, the plastic material of the 'comb' is now much closer to the other set of plates and as dirt builds up on the 'comb' surfaces, i.e. the surfaces of the teeth and intervening gaps, reducing the gap between oppositely charged adjacent plates, and increasing the electric field strength between these dirty comb surfaces and the proximate opposite polarity electrodes, corona leakage currents will develop and reduce the efficiency of the filter.

It will be noted that the two families of different potential plates are held separately in the known filters illustrated of FIGS. 2A, 2B, 2C and FIGS. 3A and 3B. Therefore the leakage path between the opposite polarity plates is reduced from the multiple small gaps of the filter shown in FIG. 1A (and even in FIG. 1B) to a single path at the top and bottom of the plate stack where the two families of support rods or combs are fixed together.

However, under conditions of high humidity and/or high levels of dirt deposition even this separation of the two families of different potential plates can give rise to undesirable levels of leakage currents at the points where the two families of support rods or combs are themselves fixed rigidly together to provide a rigid filter. Electrical current would then flow from each electrode plate or film of one polarity onto their family of support rods or combs, i.e. those in direct electrical contact with that set of electrode plates or films, along the dirty surface of these rods or combs onto the junction(s) with the other family of support rods or combs, and thence similarly along this second family of support rods or combs to the opposite polarity family of electrode plates or films.

Each of the aforementioned filter constructions shown in FIGS. 1A to 3B is appropriate provided the distance between adjacent plates, i.e. the plate separation, is 2 mm or greater. However, difficulties arise in terms of manufacture and long term isolation for plate separations of less than 2 mm.

As the plate separation decreases, the number of plates will need to increase. At a separation distance of 2 mm or less, the number of plates for a practical air conditioning filter will become too great to align with the corresponding grooves in the isolation walls (if the constructions shown in FIG. 1A, 1B, 3A or 3B were to be followed) due to the small variations in the planarity of the plates (i.e. how perfectly flat each is) and distortions due to the lack of rigidity of the plates, thereby preventing individual plates being correctly aligned with the corresponding grooves in the support rods or isolation walls as the comb is presented to the electrode stack. Similarly with the filter construction shown in FIGS. 2A to 2C, the number of metal spacers and the clearance tolerances make assembly of a close spaced filter very difficult.

Notwithstanding the numerous aforementioned problems, there are advantages in providing a filter having a plate separation distance of less than 2 mm, in that it enables a 'high' filtration efficiency (of the order of 99%) in a relatively thin (in the direction of airflow) filter, e.g. a filter of 15 mm depth. Accordingly, attempts have previously been made to provide such a filter and are described in certain of the patents in the name of Gaylord W Penny, such as U.S. Pat. Nos. 2,948,353 and 4,861,356.

However there are very few, if any, electrostatic precipitators having a particle capture filter (a) in which the plate separation is less than 2 mm, and (b) which have been successful in long-term operation, i.e. one year or longer before washing because of the difficulties encountered with provision of suitable electrical isolation (as discussed above), which have led to failure in operation and/or the need for excessively frequent and time consuming washing of the filter.

The present state of this technical field, according to the inventors' detailed understanding thereof, is that it is difficult to both physically support and electrically isolate closely spaced plates/electrodes having a plate separation at or below 2 mm in the design and construction of an electrostatic air filter which operates at 'high' efficiency (of 99% or greater) and small depth (of 15 mm or less) in direction of airflow.

It is therefore an object of the present invention to provide an improved air filter for use in an electrostatic precipitator, in which many, if not all, of the aforementioned problems and design issues are at least mitigated.

First Aspect of the Invention

Accordingly, in a first aspect the present invention provides a filter for an electrostatic precipitator, said filter comprising: a plurality of spaced-apart, electrode films (plates) having electrical conductivity, arranged to be alternately powered at comparatively high and low electrical potentials, each of said electrode films having a leading edge, a trailing edge, and two opposing side edges therebetween that extend in the direction of airflow; and first and second pluralities of spaced-apart, rigid isolation members bonded to each of the leading and trailing edges of the plurality of electrode films respectively, wherein each isolation member is bonded, via a substantially continuous, preferably flat, surface thereof, to at least some of said leading or trailing edges, thereby fixing the electrode films in the required spaced-apart arrangement thereof.

Bonding of each of the electrode films to the pluralities of isolation members (by means of a substantially continuous, preferably flat, surface comprised in each isolation member) provides the required spaced-apart configuration of the electrode films without the need to use spacer elements or other such additional elements that might be required in prior art filters. Such bonding provides the filter with overall rigidity and structural integrity. Each isolation member is bonded to at least some of the leading and trailing edges of the electrode films to allow for alternate powering of the electrode films at comparatively high and low electrical potentials and for spanning only a subset of the full set of electrode films (although any isolation member may span the full set of electrode films).

By 'substantially continuous surface' is meant that the surface is essentially without interruption, though may include undulations. By 'substantially flat surface' is meant that the surface is not provided with any tooth-like, finger-like or other such element that could be used to support or grip the electrode films; there may be undulations or other imperfections in the flat surface, but these fall within the definition of 'substantially flat' in this specification. In other words, it should be understood that the two sets of electrode films or plates (alternately powered at comparatively high and low electrical potentials respectively) are fixed in place using bonding as the ONLY fixing method. External 'combs', 'racks' or any other like component having means to 'grip' or otherwise clamp the electrode films, as are used and described in the prior art, are simply NOT required by the present invention, and indeed would be detrimental when used with the closely spaced electrode plates or films that are envisaged—bonding alone 'thereby' fixes the electrode films in the required spaced-apart arrangement thereof.

In certain circumstances, the electrode films may be metallic, optionally comprising an alloy of two or more metals. Such electrode films would have inherent electrical conductivity.

In other circumstances, the electrode films may be non-metal but still be provided with electrical conductivity (as will described in more detail below) so as to allow them to serve their intended function. In these embodiments, bonding of each of the electrode films to the pluralities of isolation members would furthermore overcome any increase in deflection of the non-metal electrode films that may otherwise occur on application of an electric field of 2 kV/mm or more.

In yet other circumstances, some electrode films may be metallic (as described above) and some may be non-metal (as described above) if the circumstances for installation of the filter determine that such an arrangement would be best.

Using a different construction and, in the case of non-metal electrode films, different materials from conventional air filters designed for use in electrostatic precipitators enables achievement of 'high' efficiency filtration (e.g. 99% at 0.3 micron particle diameter).

Electrode Spacing

Preferably, the spacing between adjacent electrode films may be equal to or less than 2 mm and further preferably equal to or less than 1 mm. Thus the spacing between adjacent electrode films may be in the range of 0.1 mm to 0.8 mm, more preferably in the range of 0.25 mm to 0.75 mm. In one embodiment, the spacing between adjacent electrode films may be 0.5 mm.

Electrode Thickness

Accordingly, each electrode film may have a thickness of equal to or less than 0.5 mm, preferably equal to or less than 0.25 mm. Each electrode film may have a thickness in range of 0.01 mm to 0.1 mm.

Electrode Depth

Preferably, each electrode film may have a depth, i.e. the dimension in the direction of airflow, of equal to or less than 50 mm and further preferably equal to or less than 40 mm. Thus each electrode film may have a depth in the range of 5 mm to 30 mm, more preferably in the range of 10 mm to 25 mm. In this way, a filter of relatively 'thin' depth, i.e. extension in the direction of airflow, e.g. of 15 mm depth, which is effective when operated in an airflow in the region of 1-3 m/s may be provided.

Electrode Materials

In the filter of the present invention, the plates are: (a) metal electrode films having inherent electrical conductivity; (b) non-metal electrode films having electrical conductivity, i.e. they may comprise one or more metals, e.g. aluminium, or other conductive material(s), e.g. carbon, as a minor component, but are made from materials other than metals as the major component; or (c) some are metal electrode films and some are non-metal electrode films, preferably provided in an alternating manner.

At the thickness used, e.g. 0.1 mm, such plates (a), (b) or (c) may be inherently rigid or have some degree of flexibility, but on the application of an electric field of 2 kV/mm or more while unsupported, may exhibit some (or an increase) in deflection. This is an undesirable consequence of the choice of the film material (selected for other intrinsic advantages, such as film thickness), but one that is accounted for and overcome in the design of the inventive filter. This is in contrast to many prior art filters in which thicker, e.g. 0.5-1 mm, metal electrodes/plates are provided, which are inherently rigid and remain so even on application of an electric field of 2 kV/mm or more.

Metal Electrodes

Thus, in some circumstances, one or more of the electrode films may be in the form of a metal foil or sheet. Suitable examples include stainless steel foil, aluminium foil, and titanium foil. A person skilled in the art would readily be able to determine which other such metal foil materials would be usable in a filter according to the invention. Whichever material is selected, the thickness of the foil used would be determined by the stiffness or flexibility of the chosen material (within the limits described above).

Non-Metal Electrodes

In other circumstances, one or more of the electrode films may be made from a polymeric material having electrically conductive particles therein and/or thereon. In one embodiment, one or more (preferably both) of the electrode films may be made from carbon-loaded polypropylene. Any other commercially available plastic film of suitable stiffness could alternatively be used. Suitable electrically conductive particles include carbon and graphene.

Additionally, or alternatively, one or more of the electrode films may be made from a polymeric material provided with a coating, ink or paint on at least a portion of one or both of its faces. Said coating, ink or paint may be electrically conductive or semi-conductive. In one embodiment, one or more of the electrode films (preferably both) may be made from plastics film having an indium-tin oxide (ITO) coating on one of its faces. In a further embodiment, one or more of the electrode films (preferably both) may be made from plastics film having a carbon-loaded ink coating on one of its faces.

Preferably, the coating, ink or paint may be recessed from each of the leading and trailing edges of the one or more electrode films so as to form gaps between each of said edges and the coating, ink or paint. Such a configuration may provide an increased level of electrical isolation, particularly as dirt builds up on the leading edge of the electrode films, thus reducing the likelihood of corona discharge at the edges.

Further preferably, the gap between the coating, ink or paint and the leading edge of an electrode film may be greater than the gap between the coating, ink or paint and the trailing edge of the electrode film. This is important because the electrode depth in the direction of airflow must be minimised for many applications, therefore providing a greater isolation (by means of a comparatively greater gap) at the dirtier, leading edge and less isolation (by means of a comparatively lesser gap) at the trailing edge, which is subjected to an airflow of filtered air and therefore will exhibit less of a dirt build up, may be desirable.

Bonding

Bonding of each of the first and second pluralities of spaced-apart, rigid isolation members to each of the leading and trailing edges of the plurality of electrode films may be achieved using any fluid or semi-fluid material (bonding means) that sets after its application, e.g. it may be inherently rapid-setting or it may require UV curing. Suitable examples of such bonding means include: polymerising resins, thermosetting resins, adhesives, glues, hot-melt adhesives, waxes, and other such like materials known to a person skilled in the art.

Notches in Electrodes

Advantageously, a series of notches may be provided in each of the leading and trailing edges of the plurality of electrode films, and wherein the first and second pluralities of isolation members may be bonded to said edges between said notches. Such a configuration may allow each of the high potential and low potential groups of electrode films to be independently supported and spaced thus minimising the surface leakage current paths.

It should be understood that these notches in no way provide a means of fixing the electrodes to the isolation members. Each notch merely provides a gap in an edge of an electrode film of one polarity (e.g. a high potential plate) to accommodate (without any contact being made) an isolation member that is bonded to an un-notched portion of the corresponding edge of the or each adjacent electrode film of the opposite polarity (e.g. a low potential plate). The bonding (means) alone provides the fixing of the electrode plates or films in a suitably supported and placed manner.

Preferably, said notches in the leading edge may be offset from the notches in the trailing edge, when viewed in the direction of airflow. Alternatively, the notches in the leading edge may be directly opposite to the notches in the trailing edge, again when viewed in the direction of airflow. In either case, adjacent electrode films may be offset from each other such that the notches in every other electrode film are aligned with one another along each of the leading and trailing edges, such that the first plurality of isolation members is bonded only to the electrode films of one polarity, and the second plurality of isolation members is bonded only to the electrode films of the opposite polarity, thus preserving the isolation between the two polarity families of electrodes. In certain designs of filter it may be preferable to stagger the notches to provide more mechanical support to the electrode films.

Slots in Electrodes

Preferably, a series of slots may be provided in each of the leading and trailing edges of the plurality of electrode films, each slot defining a recessed edge portion, and wherein the first and second pluralities of isolation members are bonded to said recessed edge portions of, and at least partially accommodated by, said slots. Further preferably, the first and second pluralities of isolation members are fully accommodated by said slots.

The provision of such slots, with at least partial (if not full) accommodation of the isolation members therein, means that the overall depth of the filter in the direction of airflow is kept as small as possible based on the depth of the electrode films. In other words, any negative effect on the depth of the filter, which may need to be carefully controlled, due to the provision of the pluralities of isolation members is mitigated, if not completely removed.

Beneficially, each slot in the series of slots may be provided adjacent to at least one notch in the abovementioned series of notches. In other words, extending along each long edge of each electrode film may be provided a notch, followed by a slot, followed by a notch, followed by a slot, etc. The arrangements of notches and slots in each edge of an electrode film may mirror one another or be offset.

For the avoidance of any doubt, notches are different to slots and should not be confused—they perform different functions: each notch provides a gap in an edge of an electrode film of one polarity (e.g. a high potential plate) to accommodate (without any contact being made) an isolation member that is bonded to an un-notched portion of the corresponding edge of the or each adjacent electrode film of the opposite polarity (e.g. a low potential plate); whereas each slot provides a recessed edge portion to which an isolation member may be directly bonded.

Note that, when both are present, slots will be provided in the un-notched areas of the electrode films, i.e. although the areas between notches are described as 'un-notched', this does not preclude said areas from including slots, thus 'un-notched' does not also mean 'un-slotted'.

Furthermore, it should be understood that such slots do not provide a means of fixing the isolation members to the electrode films; mechanical bonding of the electrode films to the isolation members is entirely due to the bonding, and is in no way provided by the slots, i.e. there is no 'gripping' of the isolation members by the slots provided in the electrode films.

Isolation Members

Preferably, some or all the isolation members of one or both of the first and second pluralities thereof comprised in the filter may be rods, bars, batons, sticks, or other such like components or structural elements. Further preferably, said isolation members may be provided in a mutually parallel arrangement.

Preferably, the isolation members may be formed from a rigid plastics material, such as polypropylene, polyethylene, polyamide, polystyrene, ABS, etc.

When at least some of the electrode films are metallic, the isolation members may be formed from a high temperature-resistant material, such as a ceramics material.

Preferably, the isolation members of one or both of the first and second pluralities thereof may be held in a spaced-apart, parallel relationship by upper and/or lower isolation frame members. In other words, one or both of the first and second pluralities of isolation members may be in the form of an isolation frame comprising the individual isolation members, such that there may be a leading edge isolation frame and/or a trailing edge isolation frame.

Alternatively, the isolation members of one or both of the first and second pluralities thereof may be solely in the form of lines of bonding means, such as rigid adhesive, resin or other like material. In other words, the isolation members themselves may be formed only of bonding means, without any additional structural component being required. Preferably, said isolation members may be provided in a mutually parallel arrangement.

Thus, as described earlier, it is to be understood that the two sets of electrode films or plates (alternately powered at comparatively high and low electrical potentials, according to the first aspect of the invention) are fixed in place, i.e. in the required spaced-apart arrangement thereof, using bonding means, e.g. adhesive, as the sole fixing means and method. In a first embodiment, the bonding means, e.g. adhesive, is first applied to the continuous, substantially flat, elongate surfaces of the isolation members. Said isolation members would then be positioned so that the adhesive would make contact with the edges of the spaced electrode plates or films. If required, the adhesive would then set (or be set, cured, etc.) to a solid to bond and fix the electrode plates in position.

In a second embodiment, the bonding means, e.g. adhesive, would be applied as a series of adhesive beads or continuous deposits directly to a temporarily held (e.g. by means of a suitable jig or spacers, etc.) array of the correctly spaced electrode plates or films. When the bonding means subsequently set (or was set, cured, etc.), it would itself form a plurality of rigid isolation members.

Whether bonding means is applied according to either of the first or second embodiments, when it sets (or is set, cured, etc.), removable, temporary spacers or the temporary jig, etc., that had been placed between the electrode plates or films to maintain their spaced-apart relationship prior to being fixed by the bonding means are removed, leaving the electrode plates or films with bonded isolation members as a correctly spaced, self-stable structure. In this invention, comb-like members, gripping and/or locating notches or channels in frames and the like as used in the prior art are not used AT ALL on account of their disadvantages, especially with respect to close-spaced electrode plates or films.

Slots in Frame Members

Preferably, a series of edge slots may be provided in the upper and/or lower isolation frame members, each slot defining a recessed frame portion, and wherein the isolation members may be positioned between said slots. In this way, the leakage current path length between the slots may be increased.

For the avoidance of any doubt, the slots that may be provided in the isolation frame members are different to the slots that may be provided along the long edges of the electrode films. With the former, the isolation members are located between said slots; with the latter, the isolation members are located in and bonded to the recessed edge portions defined by said slots.

Rigid Support Plates

Preferably, first and second pairs of rigid support plates (i.e. four plates in total) may be provided adjacent and parallel to the first and last electrode films in the plurality thereof, each plate in the first pair of plates being outermost, and wherein alternate isolation members in each of the first and second pluralities thereof may be bonded (a) to the first pair of rigid support plates and (b) to the second pair of rigid support plates respectively.

In other words, the plurality of electrode films may be 'sandwiched' between two rigid support plates (forming the second pair), with this 'sandwich' being further 'sandwiched' between two further support plates (forming the first pair, which would then be outermost).

With such an arrangement, on each of the upstream and downstream faces of the filter, bonding of successive isolation members at each of their ends would follow a pattern of first pair of plates, second pair of plates, first pair of plates, second pair of plates, etc.

As suggested by their description, the provision of such rigid support plates would be to ensure the filter had sufficient overall rigidity and structural longevity and to allow the isolation members of each polarity to be separately supported to minimise leakage currents.

Further preferably, an electrode film may be provided on the innermost surface of each plate in the second pair of rigid plates. This means that the two electrode films that might otherwise be parallel and adjacent the second pair of rigid plates would instead be comprised in each of said 'second' rigid plates themselves. Note that the first pair of rigid plates would not be provided with such electrode films.

Tie Isolation Members

Advantageously, additional isolation members—known as tie isolation members—may be provided, preferably at intervals across the first and second pluralities of isolation members, each bonded to both the first and second pairs of rigid support plates. The presence of such tie isolation members would provide additional stability to the overall structure of the filter and connect the two families of rigid support plates to form one single stable filter.

In some instances, the tie isolation members may be provided in at least terminal positions, one at each end of both the first and second pluralities of isolation members. In other words, there may be a number of tie isolation members spread across both the upstream and downstream faces of the filter, with four of them being in 'terminal' positions, i.e. at the ends of each of the first and second pluralities of isolation members. This might be the case with a filter that is considered to be 'longer' in the direction perpendicular to air flow. Alternatively, the four terminal tie isolation members may be the only tie isolation members present in the filter. This might be the case with a filter that is considered to be 'shorter' in the direction perpendicular to air flow.

The presence of such terminal isolation members at each of the four corners of the filter would provide (yet further) stability to the overall structure of the filter and connect the two families of rigid support plates to form one single stable filter.

Shield

A filter according to the invention has first and second ends, which extend parallel to the plurality of electrode films. Beneficially, a shield may be provided at one of said ends of the filter, said shield extending across end portions of the isolation members of the first plurality thereof on the upstream face of the filter. Such a shield may be in the form of a strip that covers the ends of the isolation members only on the upstream face of the filter that is subjected to the stream of unfiltered air.

In some embodiments, the shield may extend from said end portions of the isolation members of the first plurality thereof on the upstream face of the filter to corresponding end portions of the isolation members of the second plurality thereof on the downstream face of the filter. Preferably, two shields may be provided, one at each end of the filter.

Further preferably the shield may extend over, so as to cover, the end of the filter where it is provided. Such a shield may have a U-shape when viewed in cross-section. Alternatively, the shield may be in the form of a band that wraps around the end of the filter.

Second Aspect of the Invention

According to a second aspect of the present invention there is provided an electrostatic precipitator comprising a filter according to the first aspect of the invention.

For a better understanding, the present invention will now be more particularly described, by way of non-limiting example only, with reference to and as shown in the accompanying drawings (not to scale) in which:

FIGS. 3A and 3B are successive/alternating side views of a further alternative prior art filter;

FIG. 7A is a plan view of a component of a filter in accordance with the invention;

FIGS. 7B and 7C show the construction of a filter in accordance with the invention;

FIG. 11A shows the leakage paths between the isolation members of the type of filter that is shown in FIG. 8B;

FIG. 12C is a side view of the filter shown in 12A;

FIGS. 13A and 13B show a method of increasing the current leakage path length between isolation members in accordance with a sixth embodiment of the invention;

FIRST EMBODIMENT

Figure 4A:
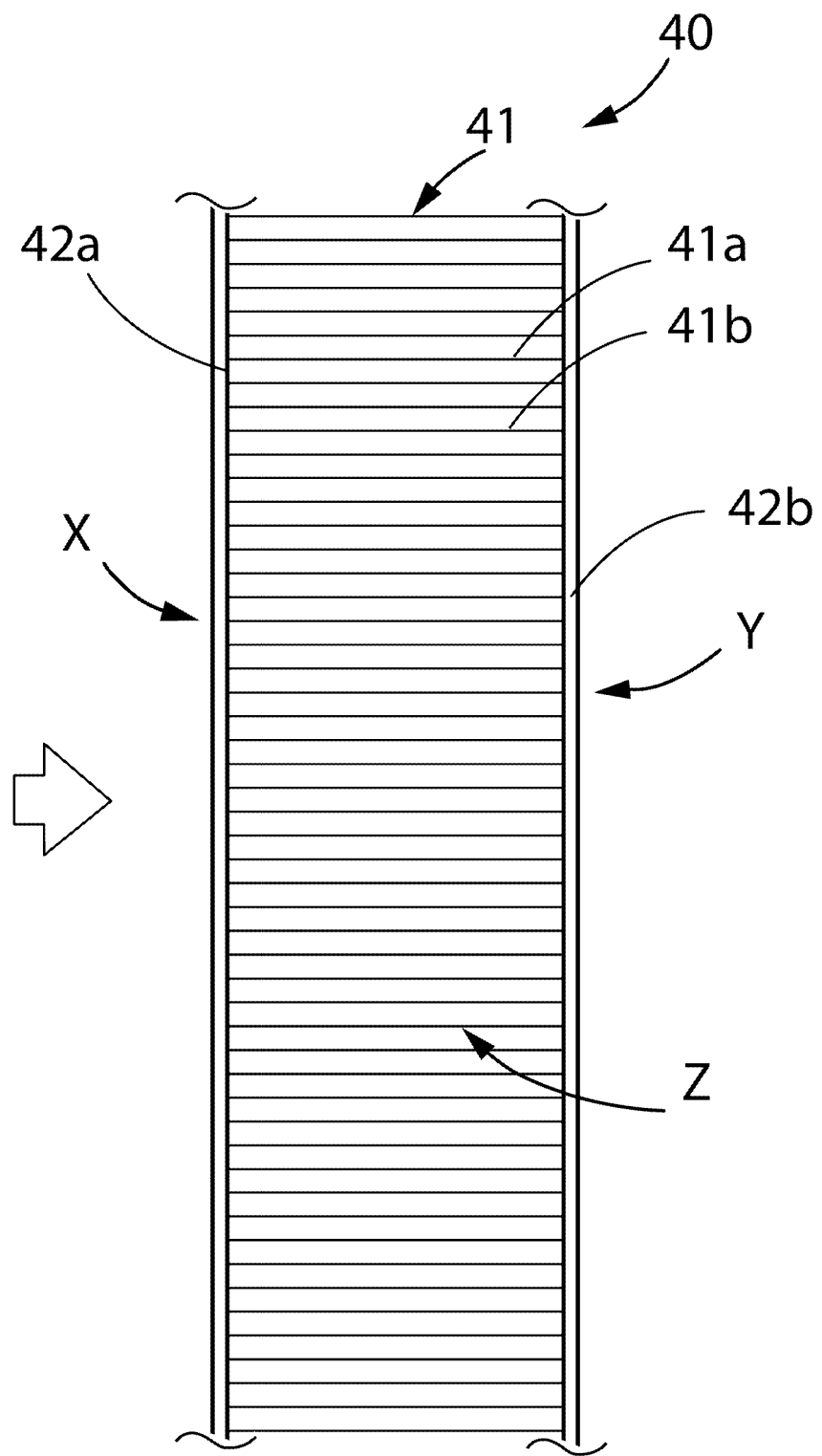
FIG. 4A is a side view of a filter in accordance with a first embodiment of the present invention.
Figure 4B:
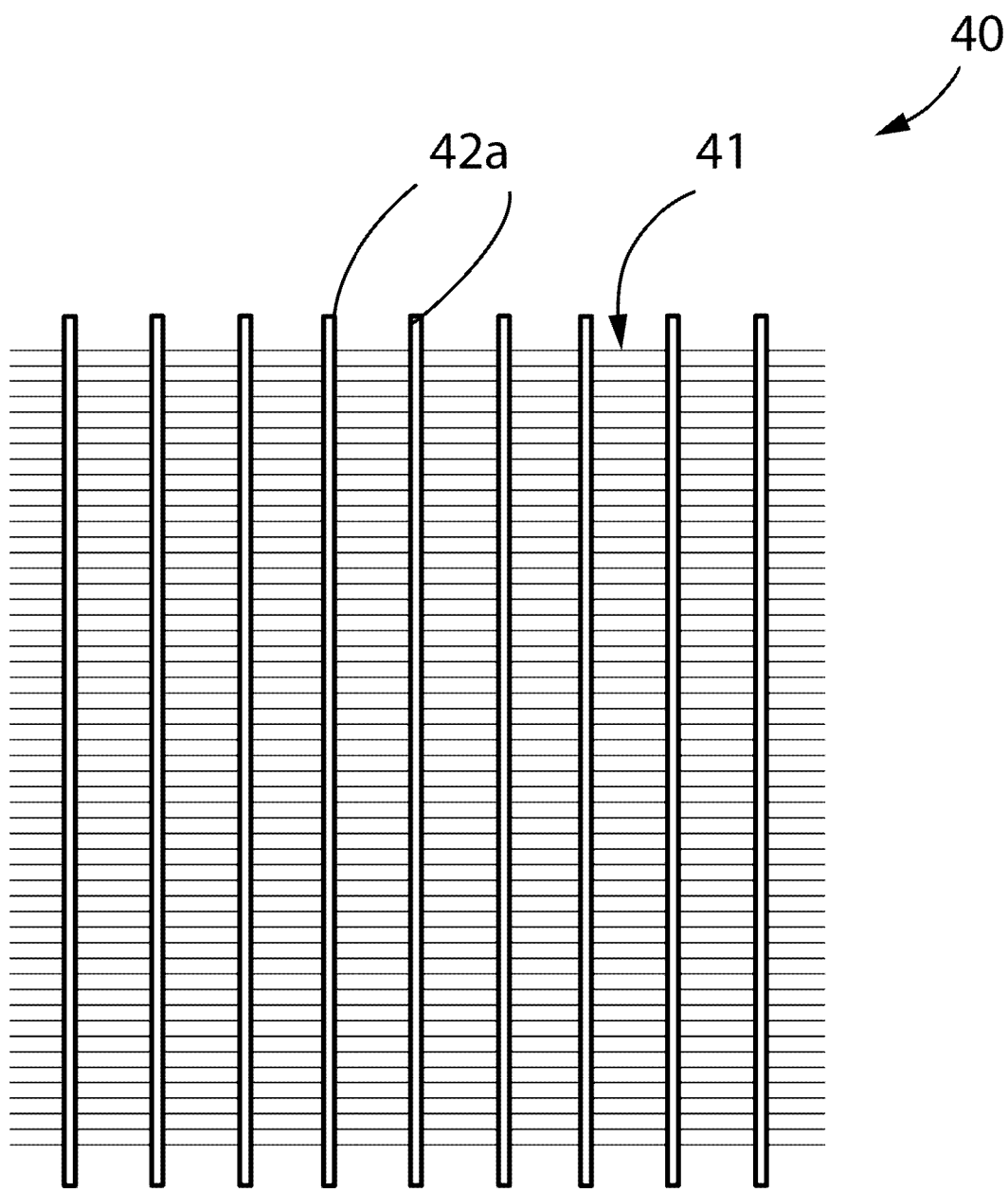
FIG. 4B is a front view of the filter shown in FIG. 4A.
Figure 4C:
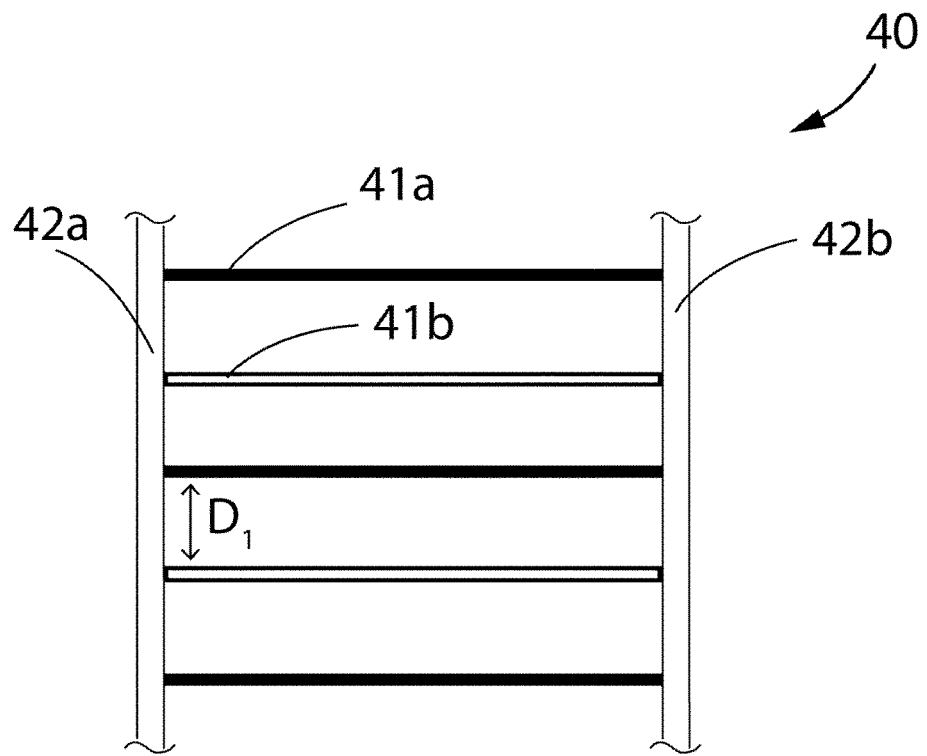
FIG. 4C is more detailed side view of the filter shown in FIG. 4A.

FIGS. 4A to 4D show a filter 40 comprising a plurality of spaced-apart, plastic (i.e. non-metal) electrode films/plates 41 having electrical conductivity by means of a conductive coating 43 of, for example indium-tin-oxide provided on both of the major surfaces thereof. The films 41 are arranged to be powered at high and low electrical potentials and thus are organised into two, interleaving and alternating sets: high voltage films 41a and low voltage (or ground) films 41b. Each film 40 has a leading edge X, a trailing edge Y and two opposing side edges Z that extend in the direction of airflow (shown by the arrow in FIGS. 4A and 4D; in FIG. 4B airflow is into the page, whilst in FIG. 4C the airflow is from left to right). Filter 40 furthermore comprises first and second pluralities of spaced-apart, rigid isolation members 42a, 42b bonded using a suitable adhesive (for example, a UV setting resin) to each of the leading edges X and trailing edges Y of the electrode films 41 respectively; each isolation member 42a, 42b being bonded via a continuous, substantially flat surface thereof to the leading edges X or trailing edges Y. Thus, isolation members 42a, 42b are bonded to both the front and back faces of the filter 40. The distance between adjacent isolation members 42a shown in FIG. 4B is approximately 10 mm. The separation distance between adjacent films 41 is approximately 0.5 mm and the depth of the films 41 in the direction of airflow is approximately 15 mm, giving a filtration efficiency of 99.9% at 0.3 micron particle diameter. Filter 40 compares directly to, and is an improvement upon, the conventional electrostatic filter shown in FIGS. 2A to 2C.

Figure 1A:
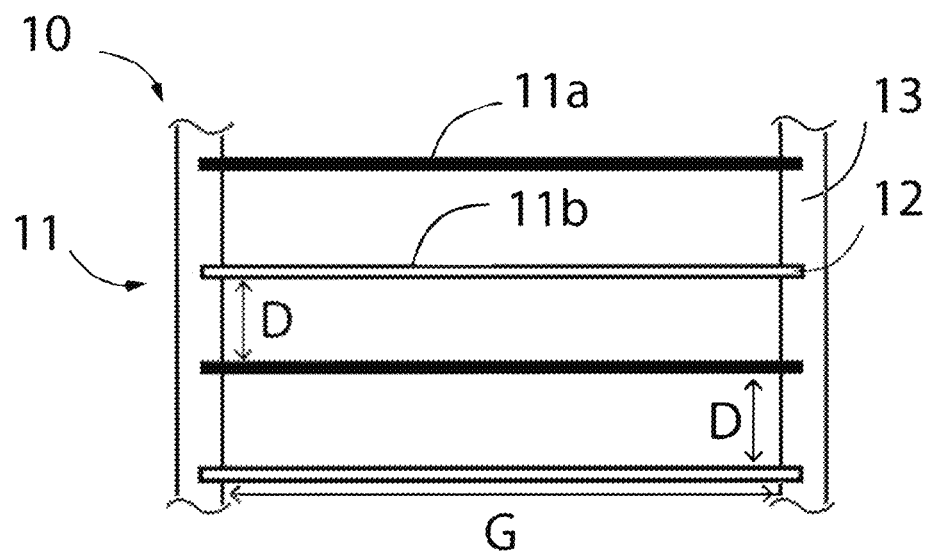
FIG. 1A is a front view of a prior art filter.
Figure 1B:
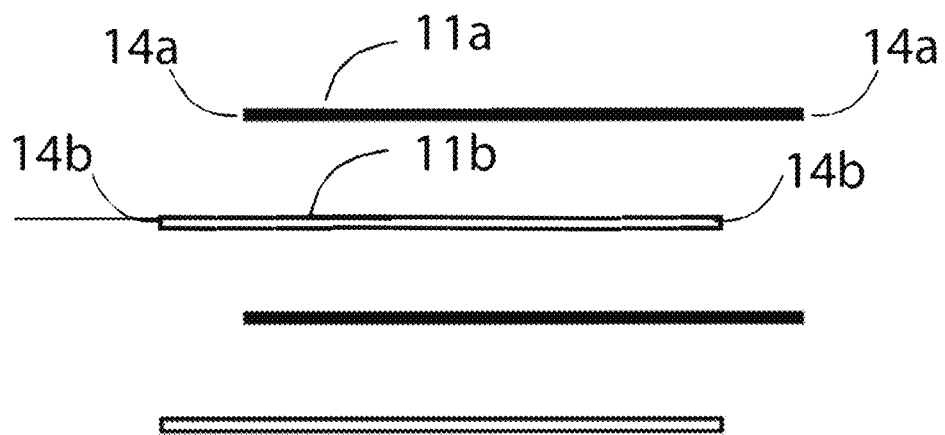
FIG. 1B is a partial side view of a modified version of the prior art filter shown in FIG. 1A.
Figure 2A:
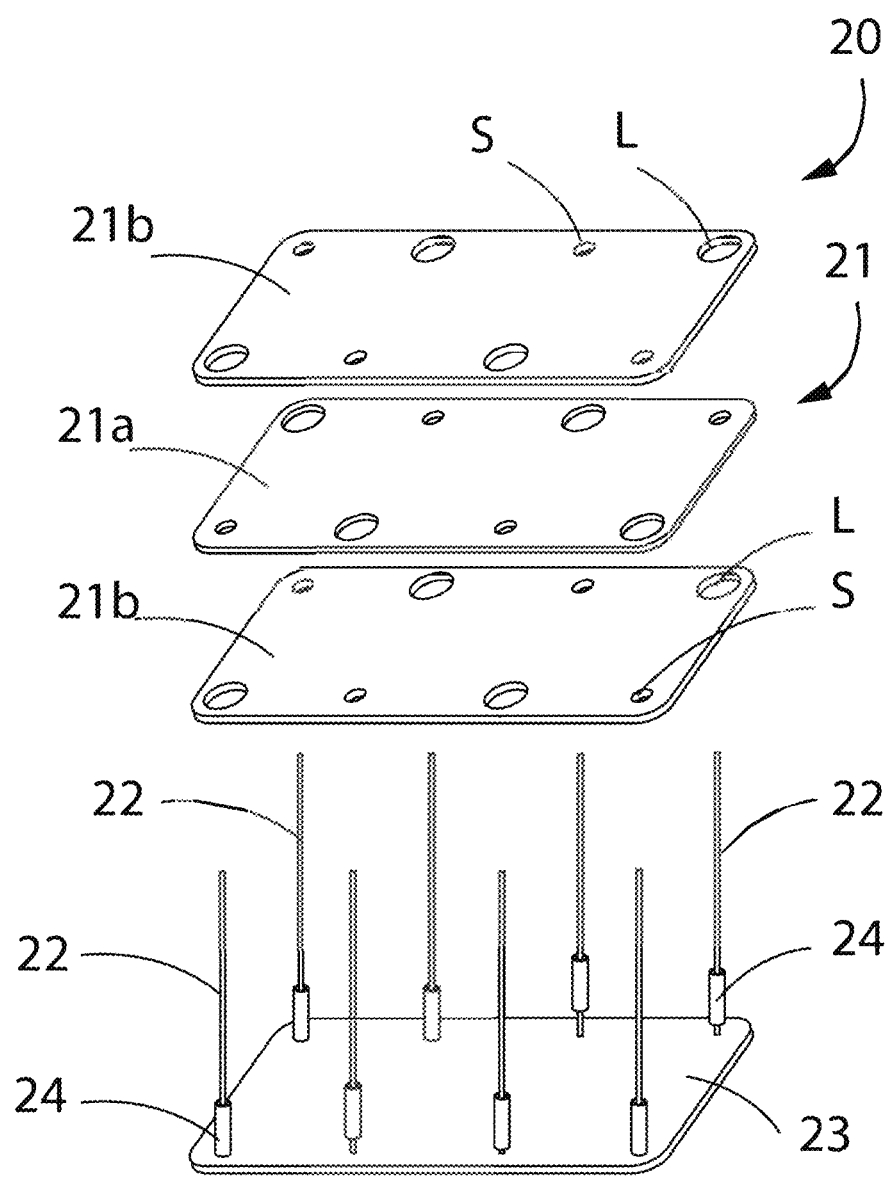
FIG. 2A is an exploded perspective view of an alternative prior art filter showing the components in part-assembled form.
Figure 2B:
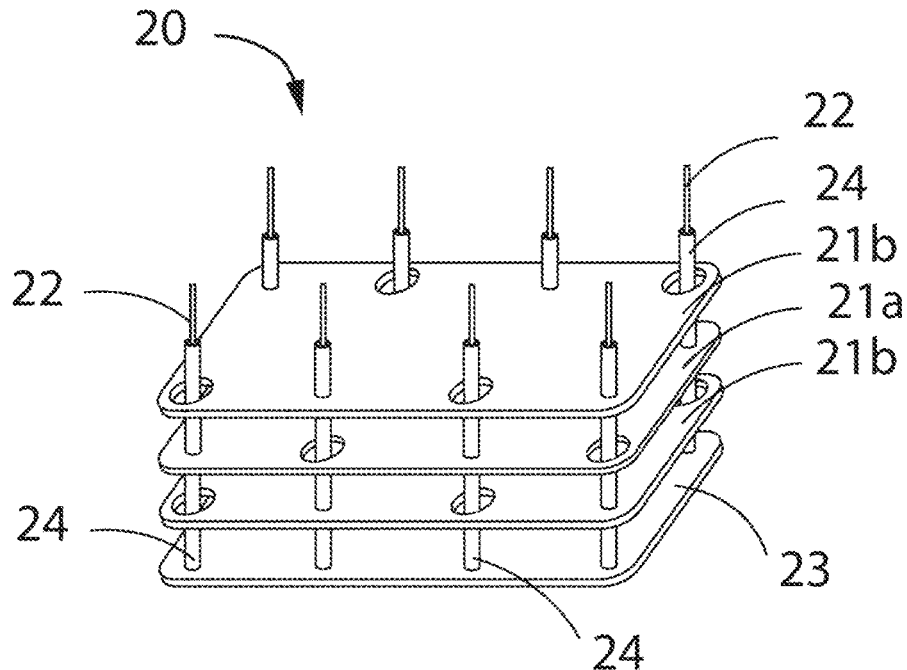
FIG. 2B is a perspective view of the prior art filter shown in FIG. 2A once assembled.
Figure 2C:
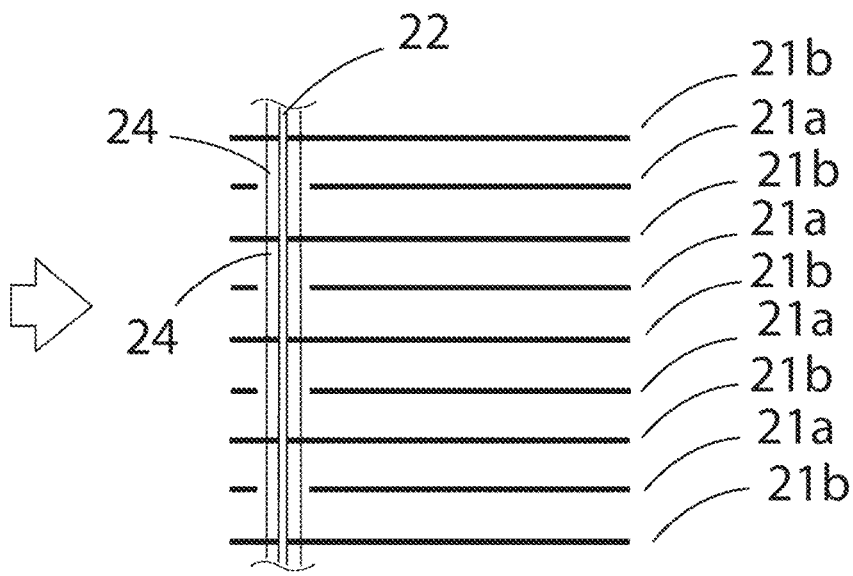
FIG. 2C is a schematic cross-section through the assembled prior art filter shown in FIG. 2B, with additional repeats of components shown.

With use of a filter 40 such as that shown in FIGS. 4A to 4D in an electrostatic precipitator, 'high' filtration efficiency (of 99.9% at 0.3 micron particle diameter) is achievable—such a filter is significantly and advantageously thinner in the direction of airflow than the prior art filter shown in FIGS. 2A to 2C. This significant improvement in filtration efficiency is achieved by the inventors' novel and inventive approach to the materials used (plastic film or other flexible, lightweight material (lightweight in comparison to conventional metal plates)), the manner of film separation (use of direct adhesive bonding to the electrode films), and the ability to achieve relatively close plate separation. Furthermore, as will be appreciated by a person skilled in the art, isolation of the films can be tailored to suit the environment in which the electrostatic precipitator incorporating such a filter is to be used.

The plastic films have very little rigidity in themselves, but when locked together on both front and back faces using adhesive applied to a series of isolation rods, the strength of the overall filter structure is unexpectedly great and suitable to create a stable and strong filter in which the electrode films are held parallel to one another and at a fixed separation distance by the isolation members at intervals that disallow any otherwise inherent flexion of the plates on application of an electric field of 2 kV/mm or more to the filter.

Because of the close film separation employed in filter 40, there may be a tendency for the pressure drop across the filter to increase. To keep this to a minimum, it is desirable to specify a maximum ratio of film separation to film thickness. This is achieved by using 'thin' plastic film plates of thickness in the range of about 0.03 mm to about 0.1 mm. Plastic films of such thickness have very little inherent rigidity and deform from a flat state under their own weight if not suitably supported. By comparison metal plates used in conventional filters are rigid and need very little, if any, support to maintain their original, inherent flatness.

In order to create a rigid structure using thin plastic film, the inventors discovered that rigid isolation members can be directly bonded onto the leading and trailing edges of the electrode film plates on the front and back faces of the filter (i.e. the two faces defining the areas of air entry into, and air exit from, the filter respectively). These rigid isolation members hold the film plates parallel and at the correct separation in the stack of plates that comprises the filter, even though the plates by themselves are too flexible to maintain their shape under gravity by virtue of the plastics or thin metal foil (or like) material from which they are made.

With filter 40, leakage current through paths over surfaces of the isolation members 42a, 42b depend on the distance D1 (shown in FIG. 4C) between adjacent high voltage films 41a low voltage films 41b, the applied voltage, the degree of dirt build-up, the type of dirt, and humidity levels. It will be appreciated that, in such a filter, there are as many leakage paths as there are electrode films 41 in the filter 40. As these leakage paths are all electrically parallel, the more electrode films 41 are provided in the filter 40, the greater the leakage current.

Figure 4D:
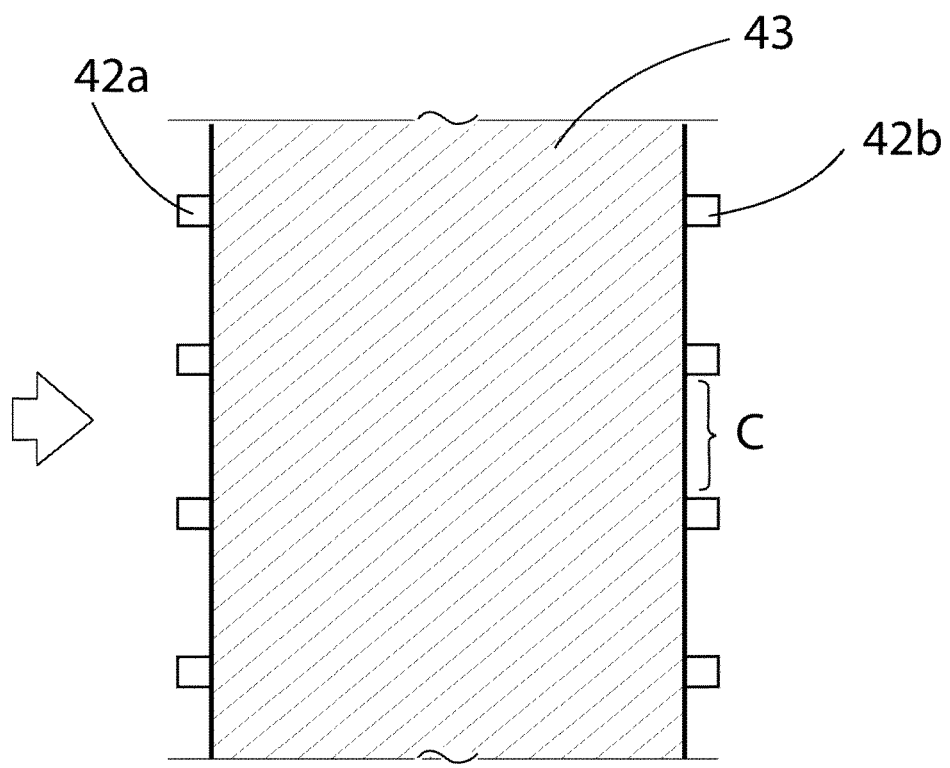
FIG. 4D is a plan view of the filter shown in FIG. 4B.

The other potential source of current leakage is corona at the edges of the electrode films 41, for example at C in FIG. 4D. The field strength at the leading and trailing edges X, Y of the films 41 will be higher than between the films per se. This electrode film edge field strength is dependent on the applied voltage and on the radius of curvature of the film edge. If the field strength is high, corona will occur and especially so with the build-up of debris, e.g. hairs or dendrites of dirt, on the leading edge X of the filter 40 with the passage of time.

Accordingly, filter 40 according to this first embodiment of the invention would be most applicable for use in an electrostatic precipitator in environments that have low loadings of particulate matter in the air and where a high degree of isolation is not required.

Of course, to reduce the possible sources of current leakage that may arise in relation to filter 40, would be advantageous so as to make said filter more widely applicable.

SECOND EMBODIMENT

Figure 5A:
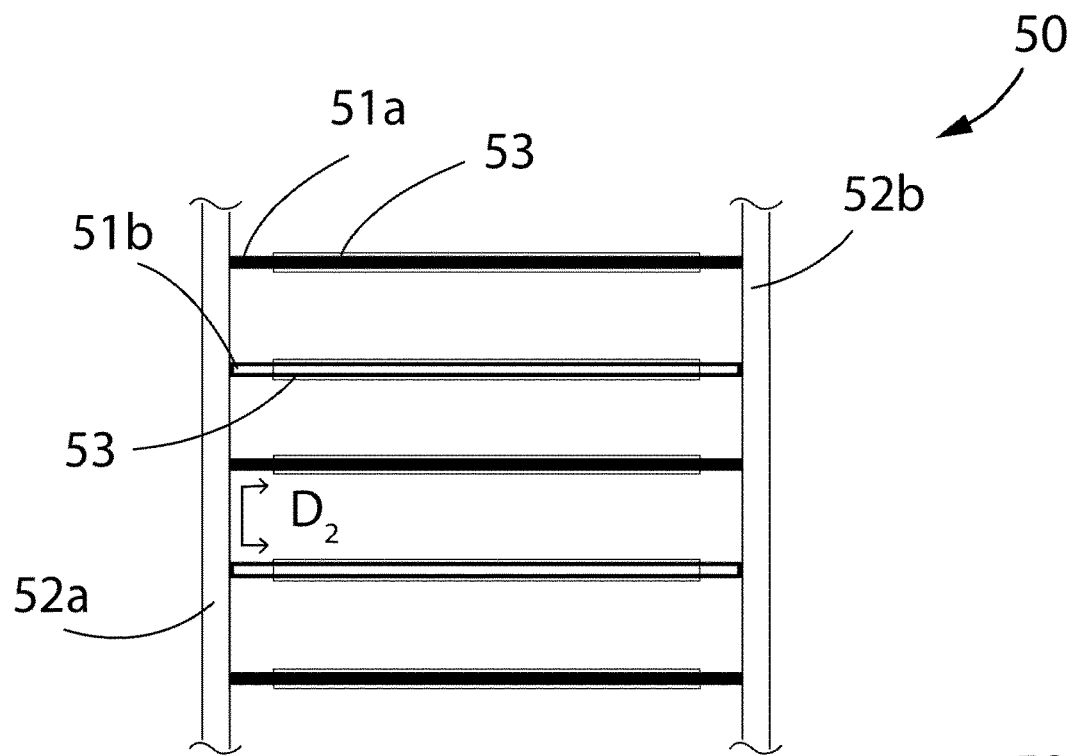
FIG. 5A is a side view of a filter in accordance with a second embodiment of the present invention.
Figure 5B:
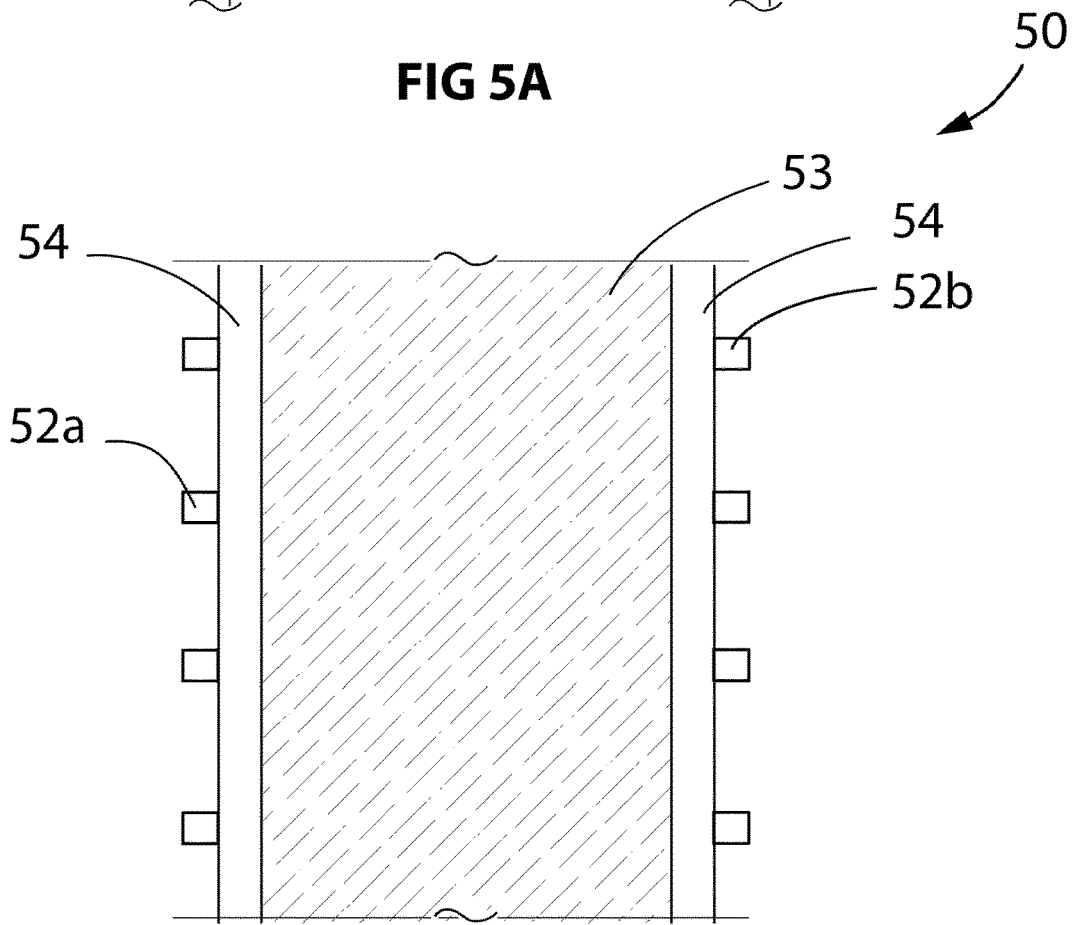
FIG. 5B is a plan view of the filter shown in FIG. 5A.

Accordingly, a second embodiment of the invention is shown in FIGS. 5A and 5B in which there is a filter 50 of similar design to filter 40 shown in FIGS. 4A to 4D. Indeed, the similarities between filter 50 and filter 40 are such that like elements are given like reference numerals (but raised in number by 10 in relation to filter 50), with only the differences being described below.

In this second embodiment, the conductive coating 53 of, for example, indium-tin-oxide provided on both of the major surfaces of the electrode films 51 is centrally located and recessed from each of the leading and trailing edges X, Y of the film 51 so as to form gaps 54. The consequences of this are twofold. Firstly, the surface leakage pathway has increased from D1 in the first embodiment shown in FIG. 4C to D2 for this second embodiment shown in FIG. 5A. Distance D2 is calculated as the sum of the separation distance between two adjacent films 51 and the two gap 54 distances. Secondly, corona emission at the leading and trailing edges X, Y of the films has been reduced or eliminated because said edges of the films are no longer conductive and therefore cannot support corona discharge. Furthermore, any tendency for corona discharge on the edges of the conductive coating 53 is suppressed by virtue of the underlying insulating film substrate.

This second embodiment provides an improved level of isolation, such that efficiency levels are kept high for longer periods of time.

Of course, to further reduce the possible sources of current leakage that may arise in relation to filter 50, would again be advantageous so as to make said filter more widely applicable.

THIRD EMBODIMENT

Figure 6A:
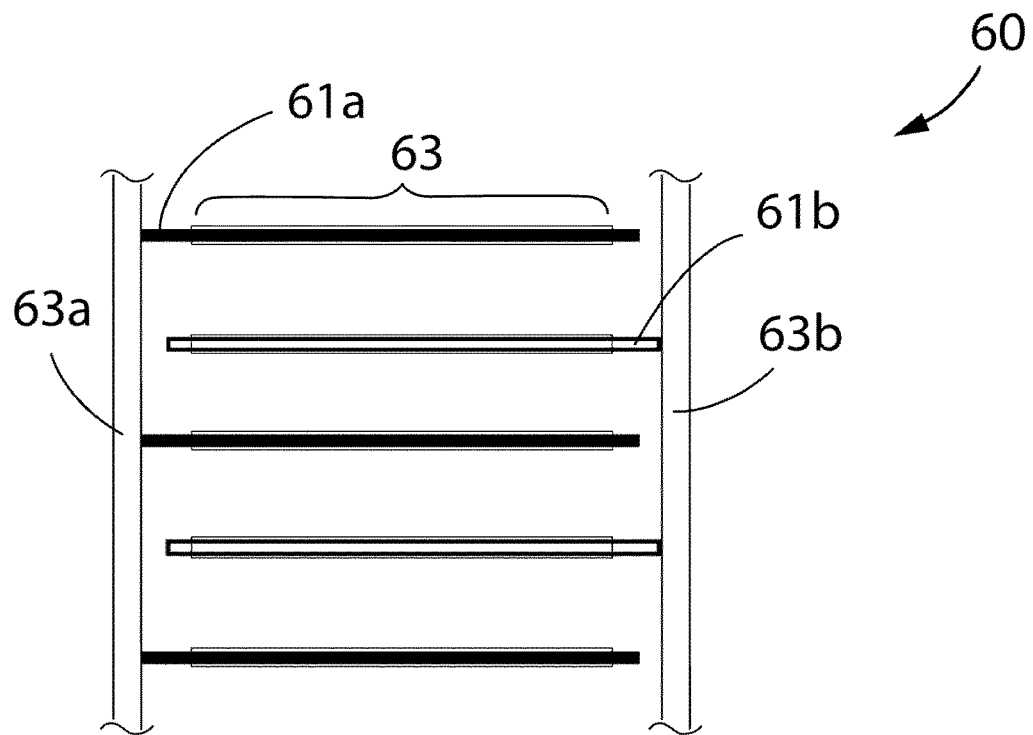
FIG. 6A is a side view of a filter in accordance with a third embodiment of the present invention.
Figure 6B:
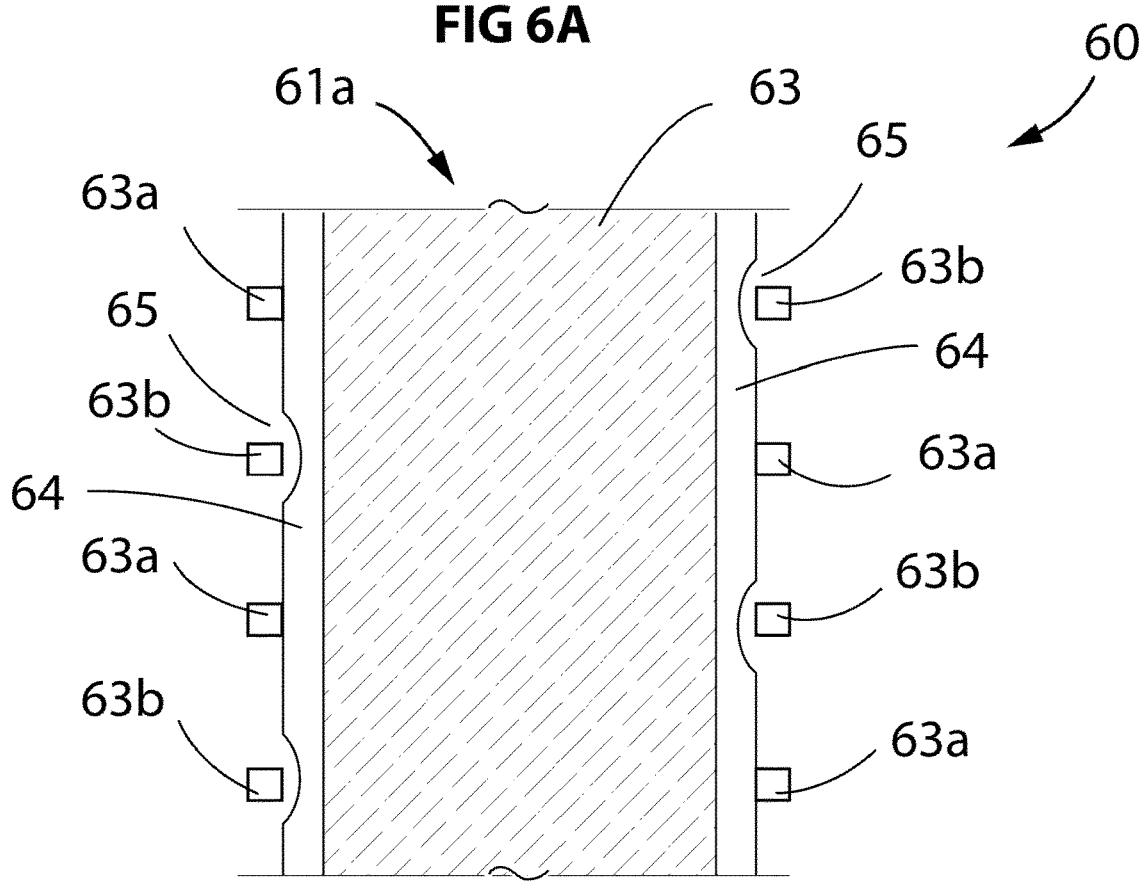
FIG. 6B is a plan view of the filter shown in FIG. 6A.

Accordingly, a third embodiment of the invention is shown in FIGS. 6A and 6B in which there is a filter 60 of similar design to filter 50 shown in FIGS. 5A and 5B. Indeed, the similarities between filter 60 and filter 50 are such that like elements are given like reference numerals (but raised in number by 10 in relation to filter 60), with only the differences being described below.

In this third embodiment, a series of notches 65 are cut into each of the leading and trailing edges X, Y of the electrode films. As shown, the notches 65 are provided in alternate positions in the high voltage films 61a and the low voltage films 61b, such that each individual isolation member 62a, 62b is bonded to the films of one polarity only, thereby eliminating the surface current leakage paths between adjacent high voltage and ground electrode films 61a, 61b. Any remaining surface leakage paths in filter 60 are of much longer distance and of higher electrical resistance (in comparison to the leakage paths in each of the first and second embodiments of the invention).

This third embodiment provides the highest level of isolation because it enables the two groups of films 61a, 61b to be supported as two distinct families, each with its own plurality of isolation members 63a, 63b—FIG. 6B shows the bonding of isolation members 63a to the leading and trailing edges of high voltage film 61a, with isolation members 63b being adjacent to, and distanced from, notches 65. Although not shown, a person skilled in the art would readily understand how to replicate this embodiment for a low voltage film 61b so as to have isolation members 63b bonded to the leading and trailing edges of said low voltage film 61b, with isolation members 63a being adjacent to, and distanced from, notches 65. The result is that the leakage path length between the two polarities of electrode films is maximised whilst the leakage current is minimised.

Accordingly, filter 60 according to this third embodiment of the invention would maintain a high efficiency and have a very long life time (comparatively) because dirt build-up would not significantly increase leakage currents. Such a filter 60 would be particularly useful in air cleaning environments which have a high particulate loading and where the particulates tend to have conductive properties.

In a further modification of the configuration of filter 60, in applications where space is restricted in the direction of airflow, it may be advantageous to increase the gap 64 between the leading edge X of the electrode films 61 and the corresponding edge of the conductive coating 63 thereon as compared to the gap 64 between the trailing edge Y of the electrode films 61 and the corresponding edge of the conductive coating 63 thereon, such that the leading edge gap is bigger. This is because the densest deposition of dirt and other debris occurs on the leading edge X, and the trailing edge Y, in contact with a filtered air stream, is subjected to considerably less debris deposition. This leads to a longer filter lifetime before corona and leakage currents reduce efficiency. The main advantage of the smaller gap at the trailing edge is that the filter can be made smaller in direction of airflow, or the depth of the active area of the filter can be increased for the same overall filter depth.

High efficiency performance in a thin filter according to the third embodiment of the invention having a depth in the direction of airflow of 15 mm and a film separation distance of 0.5 mm is demonstrated by the data in Table 1 below as Example 1. Also provided is data for a commercially available prior art filter [a Philips CRP417/01 ESP particle filter available to fit, e.g. Philip air purifier model AC4052/00] of 50 mm depth and 2 mm plate spacing. The prior art filter was operated outside of the air purifier to which it is fittable, using a field charger to charge the particles, with its efficiency measured in the same way as for the filter of the invention.

TABLE 1

| Air Velocity through Filter | % Efficiency of Prior Art Filter | % Efficiency of Example 1 Filter |
|---|---|---|
| 1 m/s | 95.8 | 99.9 |
| 2 m/s | 78.1 | 99.9 |
| 3 m/s | 58.2 | 99.1 |
| Depth of Filter | 50 mm | 15 mm |
| Plate Separation Distance | 2 mm | 0.5 mm |
| Voltage between Plates | 4.5 kV | 1.0 kV |
| Target Capture Particle Size | 0.3 μm | 0.3 μm |

Note that even though the prior art filter is more than three times deeper than the filter of Example 1, the performance efficiency is considerably poorer, especially at air velocities through the filters of 2 m/s and 3 m/s.

Method of Assembly

To assemble a filter according to any of the first, second or third embodiments of the present invention requires the accurate positioning of a large number of electrode films; to maintain the required electrical isolation requires a new method of construction and different methods of isolation.

FIG. 7A shows a rectangular isolation frame 70 manufactured from an insulating material, preferably a plastics material such as polypropylene. Injection moulding is a particularly suitable manufacturing technique. The size of the frame 70 is chosen to suit the size of the filter. In practice, two isolation frames are required, one for each of the front and back faces of the finished filter. Each frame 70 incorporates a plurality of spaced-apart isolation members in the form of rods 71.

FIG. 7B shows a plurality of plastic electrode films 72 held in a spacer jig 73. The films 72 are held so as to be perfectly flat at the required filter design spacing and design orientation by the pressure of both ends of the spacer jig 73. Removable spacer strips (not shown) of a thickness equal to the desired electrode film separation distance are temporarily placed between the electrode films 72. The jig 73 compresses the stack of films 72 and interleaved separator strips (not shown). The leading and trailing edges of the films 72 protrude from the jig 73 to enable the gluing of the each of the two isolation frames 70 to said respective edges.

The two isolation frames 70 are coated with an adhesive on the surfaces of the isolation spacing rods 71 intended to contact the film edges. The isolation frames 70 are then placed in contact with the edges of the films protruding from the jig 73, which causes the adhesive layer on the isolation rods 71 to bond the film edges to the isolation rods 71 of the isolation frames 70, as shown in FIG. 7C. When the adhesive has dried or has been cured or otherwise set, the spacer strips in the jig 73 are removed. The two isolation frames 70 may then be bonded to each other externally to the film stack to create a stable 'box' frame for the filter.

In this manner, all the electrode films 72 are bonded to the isolation rods 71 at the same time, allowing films 72 at close separations to be practically assembled into a filter.

Figure 8A:
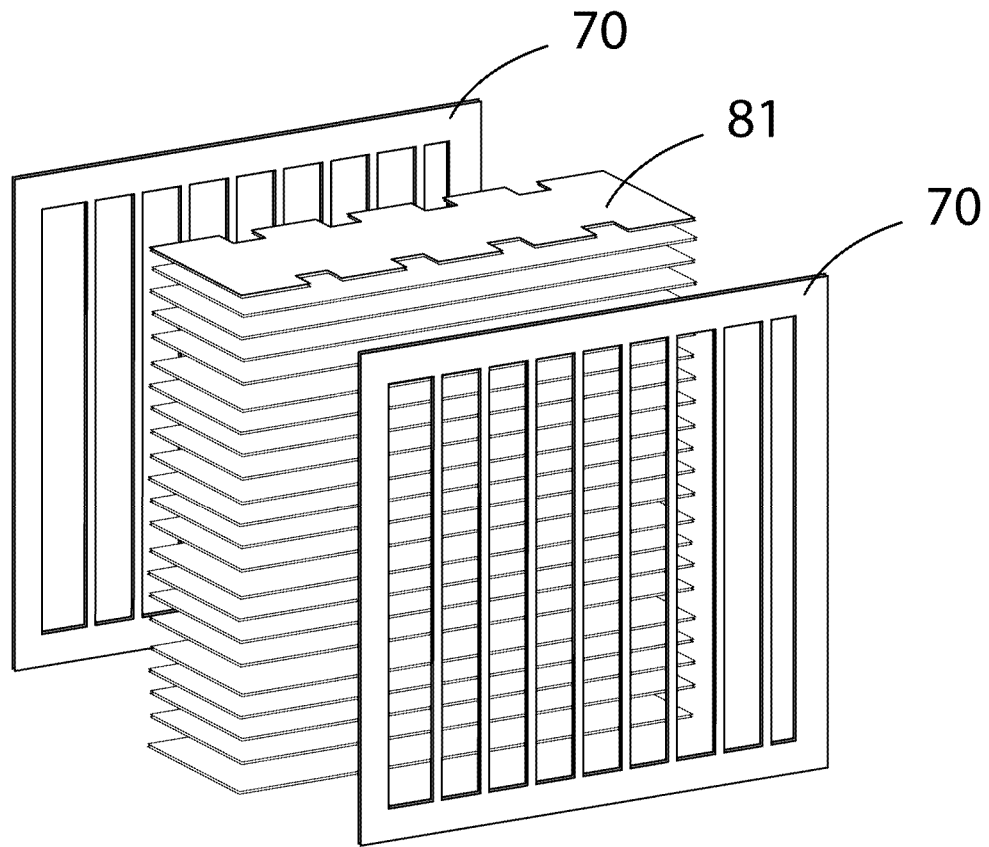
FIG. 8A is an alternative exploded, perspective view of the filter shown in FIGS. 6A and 6B in part-assembled form.
Figure 8B:
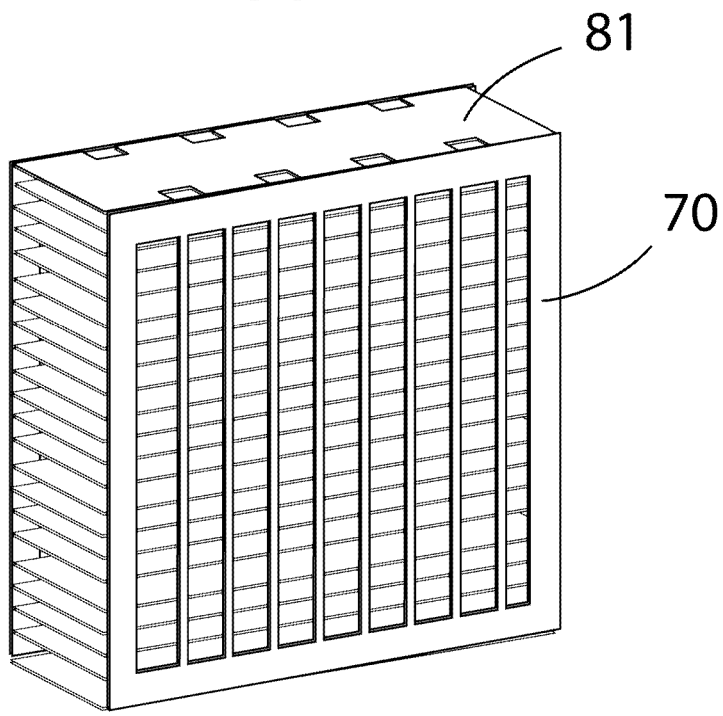
FIG. 8B is a perspective view of the filter shown in FIG. 8A once assembled.

With particular reference to the filter of the third embodiment of the invention, this method of filter assembly and the resulting bonded filter are shown in FIGS. 8A and 8B.

For clarity, only the topmost electrode 81 is shown with notches to allow the alternate bonding of each of the two families of films (high voltage and ground) to its own set of isolation rods 71 to preserve electrical isolation thereof.

Figure 9:
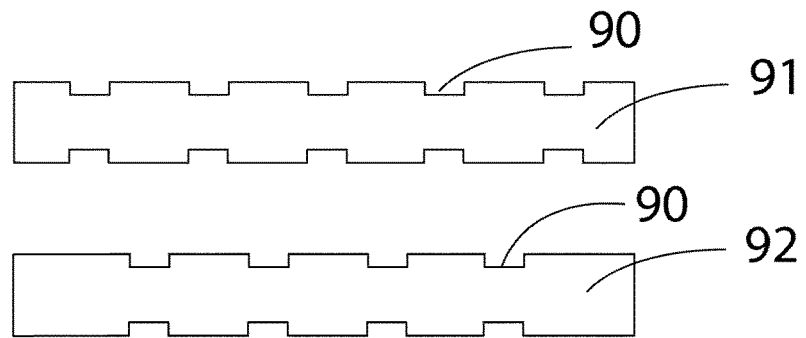
FIG. 9 is a plan view of components of a filter in accordance with the invention.

An example of complementary notched electrode films is shown in FIG. 9. A high voltage electrode film 91 and a ground electrode film 92 with an opposite phasing of the notches 90 are shown. This opposite phasing allows adhesion of the remaining (un-notched portion) of the leading and trailing edges of the films 91, 92 to isolation members so that the different polarity films are bonded to corresponding and separate isolation members.

Alternative Method of Assembly

Figure 10A:
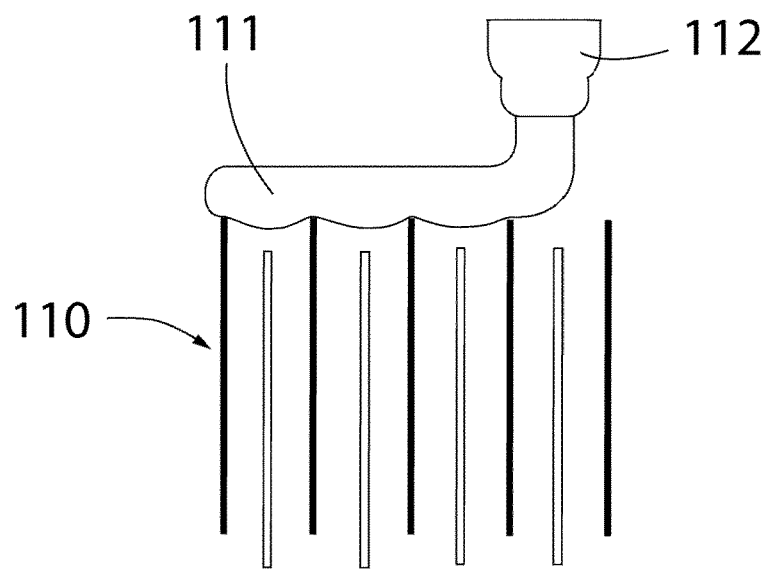
FIG. 10A is a schematic representation of the construction of a filter in accordance with the invention.
Figure 10B:
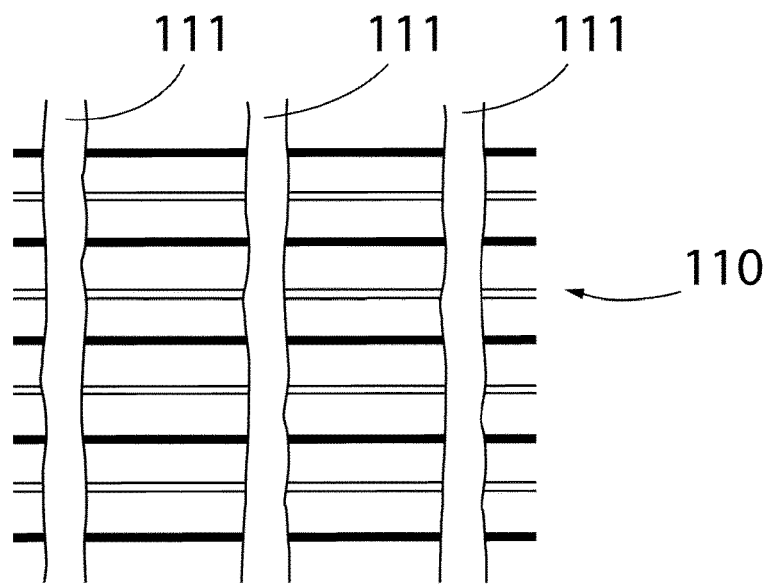
FIG. 10B is a filter so constructed as shown in FIG. 10A.

An alternative method of stabilising and supporting a stack of electrode films is shown in FIGS. 10A and 10B.

Instead of bonding electrode films 110 to a rigid isolation frame as described above, a strip of adhesive, putty, resin etc. or molten material 111 can be deposited, for example by extrusion from a nozzle 112 onto the leading and trailing edges of the electrode films 110, with temporary spacer strips (not shown) holding the films 110 at the correct, desired spacing, while the films 110 are held and or compressed in a similar jig.

The adhesive or melt may be delivered in a preferably constant stream to form a uniform bead running across the height of the stack which, upon setting, bonds to the electrode films and produces a rigid separation at the distance determined by the temporary spacer strips. The temporary spacer strips can then be removed.

This adhesive bead, when set, will conform to irregularities in the electrode film separations caused by the inherent flexibility of the plastic film material used. It will be understood that it is this irregularity that prevents the insertion of a conventional prior art solid 'comb' to hold the films in position, as even a single, slightly misplaced film edge would prevent attachment of the 'comb' as a whole to ALL the films of the stack, or else would cause two adjacent films of opposite polarities to enter the same gripping recess in a tooth of the 'comb', thus causing a short circuit.

Preferably the adhesive etc. or melt will have an appropriate viscosity that prevents misplacement of the bead by flowing under gravity and/or surface tension between the time of application and the time of setting. If the bead adhesive or melt flows too easily it will enter the spaces between the electrode films to an extent that compromises the desired filter efficiency and/or filter pressure drop and/or electrical isolation. For example, the opposite polarity electrodes may be also be accidentally bonded reducing inter family isolation. It will be appreciated that any semi-fluid material that sets after application may be used. For example a polymerising resin, thermosetting resin, adhesive, glue, hot-melt adhesive, wax etc. The parallel beads (isolation members) thus produced can thereafter be 'locked' together by means of a suitable frame to create a rigid filter assembly.

FOURTH EMBODIMENT

Of course, to even further reduce the possible sources of current leakage that may arise in relation to filter 60 shown in FIGS. 6A and 6B, would again be advantageous so as to make said filter more widely applicable.

Figure 11:
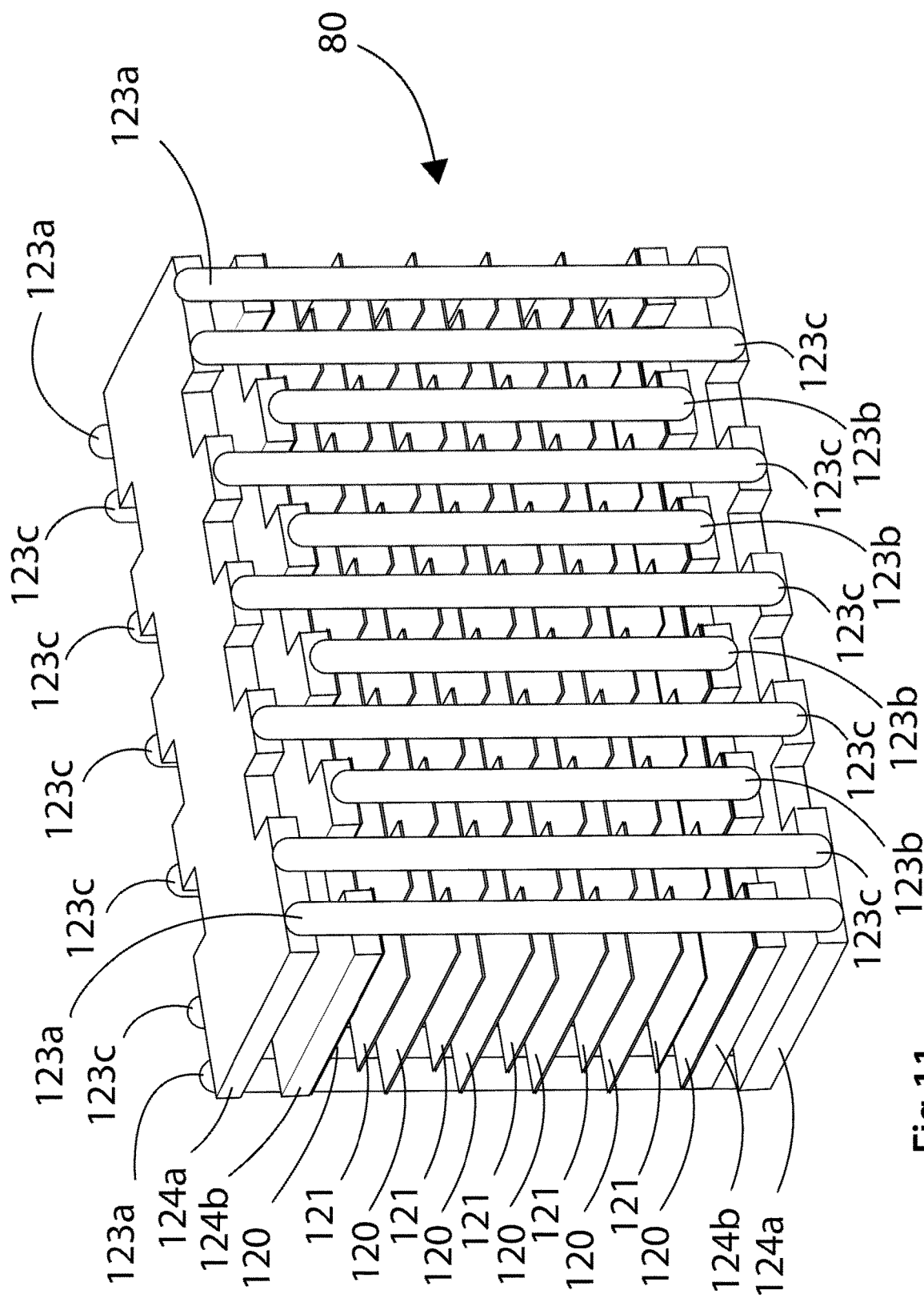
FIG. 11 is a perspective view of a filter in accordance with a fourth embodiment of the invention.

Accordingly, a fourth embodiment of the invention is shown in FIG. 11 in which there is a filter 80 of similar design to the filter shown in FIGS. 8A and 8B.

In the ensuing description, the perspective view of the filter 80 in FIG. 11 shows the upstream face of the filter facing the viewer and the downstream face of the filter at the rear of the drawing. Air thus enters the filter in a direction entering the drawing from the front, i.e. into the page, passes into the upstream face of the filter, and exits at the rear face of the filter. The uppermost edge of the filter when viewed in the orientation shown in FIG. 11 will be referred to as the top; likewise the lowermost edge will be referred to as the bottom.

In this fourth embodiment, the electrode plates or films 120 (high voltage) and 121 (ground) are supported on the upstream and downstream faces of the filter by isolation members 123*b* (supporting high voltage electrodes) and 123*c* (supporting ground electrodes). Additionally the high voltage electrodes 120 are supported by tie isolation members 123*a*, which tie together the two families of rigid support plates to form one stable rigid filter.

All isolation members, including tie isolation members, may be plastic rods with adhesive bonding to the edges of the electrode plates, or films or else beads of adhesive bonding to the electrode plates or films. Tie isolation members may have a greater cross-sectional area so as to provide them with yet further structural rigidity.

In order to provide rigidity of the complete assembly of electrodes and isolation members, each of the isolation members terminates at the top and bottom of the filter by being bonded to a relatively rigid support plate 124*a* or 124*b*. The isolation members 123*c* are bonded to the each of the two support plates 124*a* (one at the top of the 'stack' and one at the bottom of the 'stack'), whilst the isolation members 123*b* are bonded to support plates 124*b* (again, one at the top of the 'stack' and one at the bottom of the 'stack'). In total, therefore, there are four rigid support plates, 124*a*, 124*b*, two at the top and two at the bottom of the filter 'stack'. These four support plates form first and second pairs of rigid support plates which are provided adjacent the first and last electrode films in the plurality thereof, each plate in the first pair of plates being outermost. Alternate isolation members in each of the first and second pluralities thereof are bonded (a) to the first pair of rigid support plates and (b) to the second pair of rigid support plates respectively.

As a consequence, the number of leakage current paths between the high voltage and ground electrodes is greatly reduced—with reference to FIG. 11, if the eleven isolation members having ten gaps therebetween were all terminated on the same support plate or frame, rather than the configuration shown, there would be a total of forty leakage current paths (forty arising from each of the ten gaps at the top and bottom, on both the upstream and downstream faces of the filter). In other words, the number of leakage current paths is reduced from being equal to four times the number of gaps between the isolation rods to being equal to the number of gaps provided by the tie isolation members 123*a* which bridge the four support plates 124*a* and 124*b* at the top and bottom and on both faces of the filter, i.e. eight leakage paths, as shown in FIG. 11B (described further below).

In practice, the filters required may be much larger than those illustrated here by way of example and may have hundreds of isolation members. As such, the reduction in number of leakage current paths becomes very significant.

It will be obvious to one skilled in the art that the support plates may take many forms and orientations, provided each holds rigid a corresponding family of isolation members, such that the isolation members and the electrodes they bond to are held as two separate families, only connected at the places where the two support plates themselves are bridged together to form a whole rigid filter assembly. Necessarily the number of such bridge places is significantly smaller than the number of leakage paths provided by the termination of all isolation members to the same structure as shown in the isolation frame 70 of FIGS. 7A, 7B, 7C, 8A and 8B. For large filters the number of tie isolation members 123*a* bridging the support plates can be increased to maintain rigidity of the whole filter.

Figure 11B:
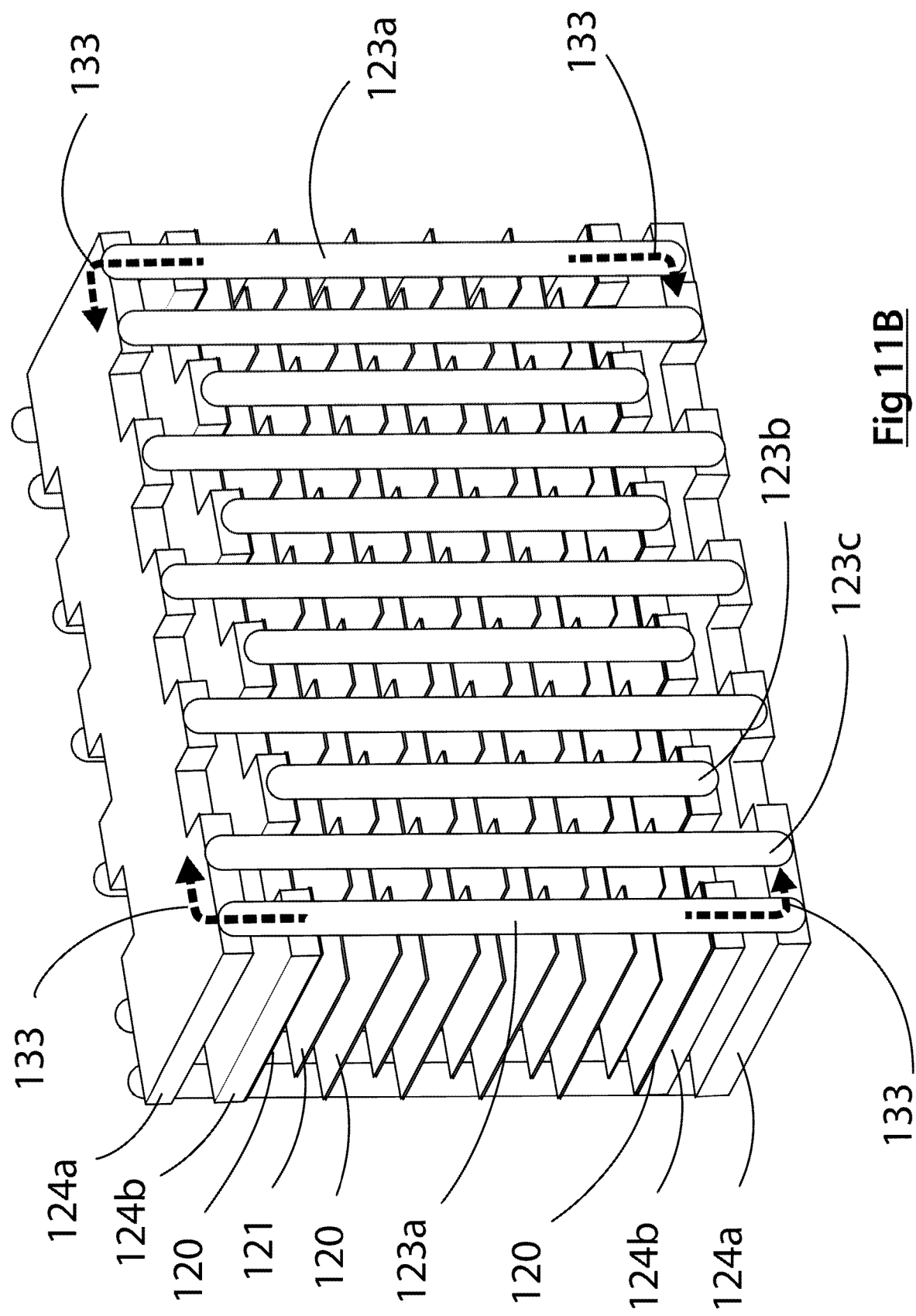
FIG. 11B shows the leakage paths between the isolation members of the type of filter that is shown in FIG. 11.

The leakage paths that typically arise with the types of filter shown in FIGS. 8B and 11 are illustrated in FIGS. 11A and 11B respectively. The dotted arrows 133 indicate the leakage current paths from the high voltage set of plates to the ground set of plates. In FIG. 11A the isolation frame 70 supports the isolation members 71 and 72. These isolation members support alternately the high voltage and the ground electrodes respectively. When dirt and humidity are present on the isolation member surfaces, the leakage currents flow from the high voltage electrodes, along the isolation members 71, onto the isolation frame 70 and thence onto the opposite polarity isolation members 72, and finally onto the ground electrodes. Clearly, there are as many leakage paths as there are gaps between the isolation members. In the example shown, with ten gaps on each filter face, there will be a total of forty leakage paths (by summing the ten paths on each of the top, bottom, front and back of the filter).

In contrast is the number of leakage paths with the fourth embodiment of the invention shown in FIG. 11B. Here again the leakage current paths are shown by dotted arrows 133. Although this filter also has ten gaps between isolation members, the number of leakage current paths between the two polarities of plates is reduced to four, and the total paths are longer than in FIG. 11A. In this embodiment, the current flows from the high voltage electrodes 120 onto the isolation members 123b and thence to the support plate 124b. These currents then collectively flow along the support plate 124b and cross over to the support plate 124a via the bridge provided by the upper and lower ends of tie isolation members 123a, which tie the two families of electrodes and isolation members rigidly together. The path lengths are considerably longer than in the filter shown in FIG. 11A, and there are only four points at which the currents flow between the support plates, thereby greatly reducing leakage current.

FIFTH EMBODIMENT

Figure 12A:
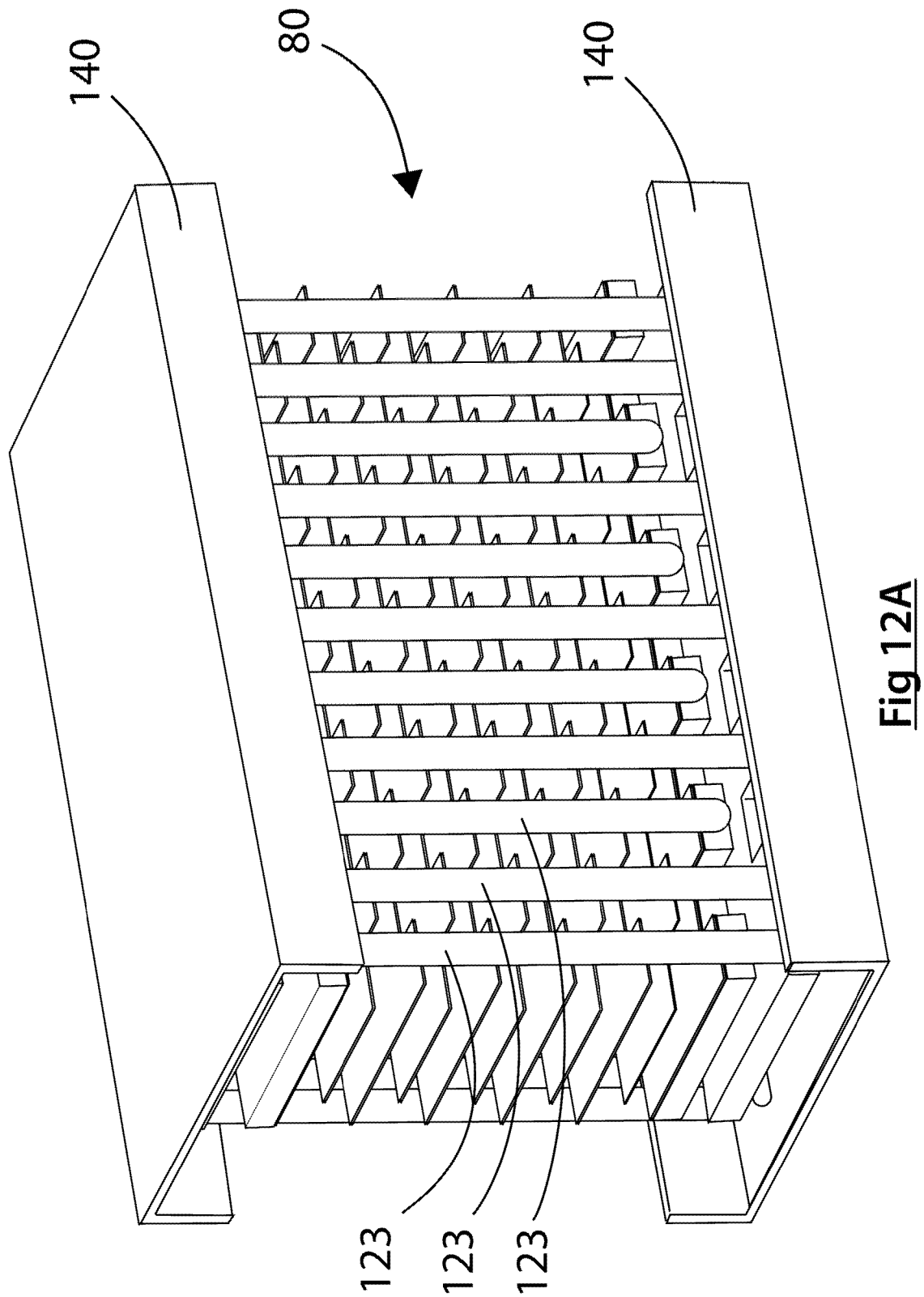
FIG. 12A is a perspective view of a filter in accordance with a fifth embodiment of the invention.
Figure 12B:
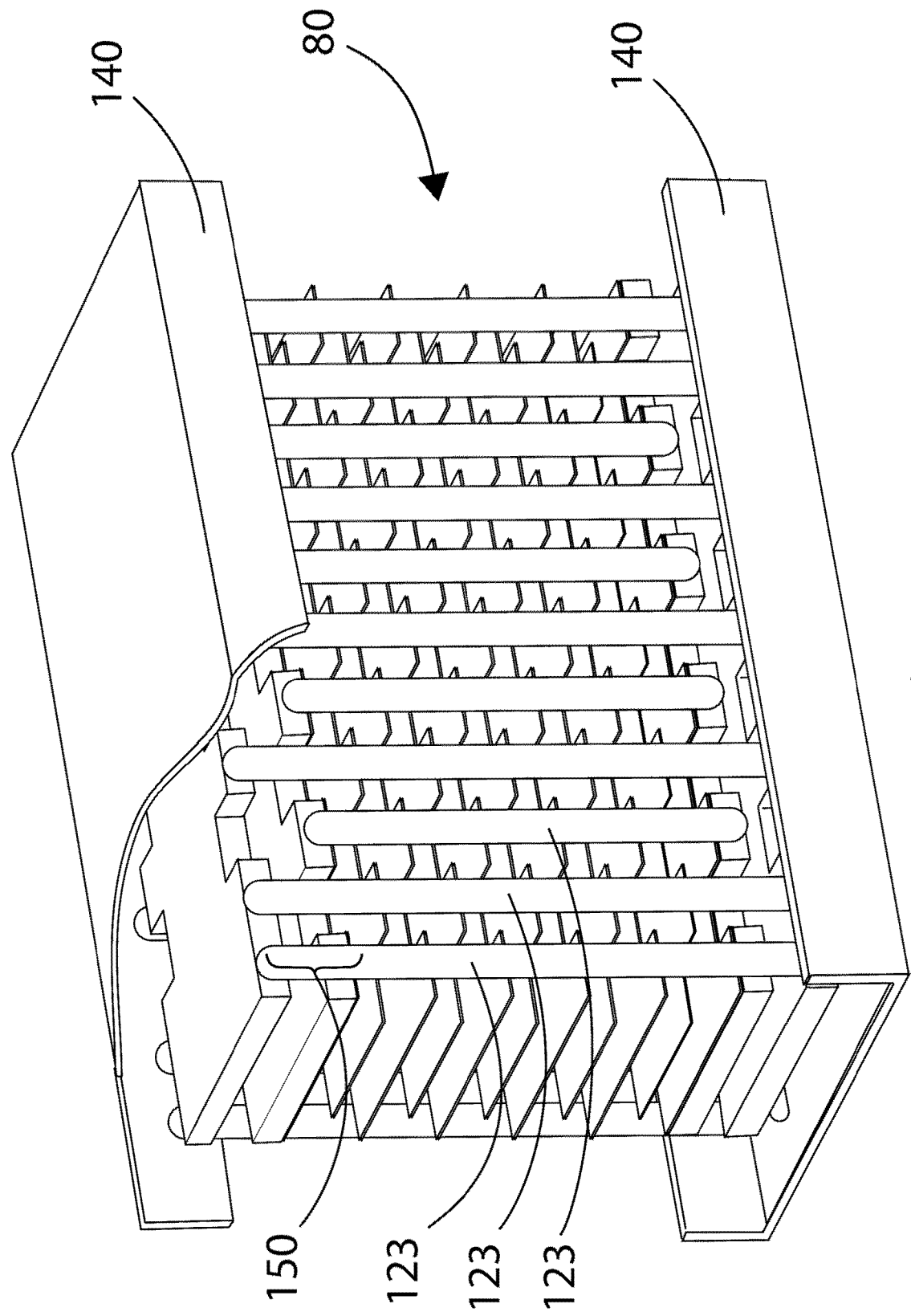
FIG. 12B is a cut-away perspective view of the filter shown in 12A.

A further aspect of the invention, which may yet further reduce the leakage currents, is shown in FIGS. 12A, 12B and 12C. As the leakage currents are increased greatly by accumulation of dirt deposits on the ideally insulating isolation members, rendering them to be partially conductive, a shield may be provided which protects the top and bottom of each isolation member on the upstream side of the filter from contact with dirt-laden air. Referring to FIG. 12A, the filter 80 of FIGS. 11, 11A and 11B is fitted with a shield 140 which prevents or reduces contact between the top and bottom areas of the isolation members 123 and the incoming stream of dirt-laden air. FIG. 12B is a partial cut-away drawing of the filter in FIG. 12A. The area of the isolation members that is protected by the shield is indicated by the bracket 150. FIG. 12C shows the same filter in side view. The arrows 151 show the incoming dirty air. The bracket 150 indicates the area of the isolation members 123 that is protected by shield 140. The filtered air exits the filter as shown by arrows 152.

The resulting area of each isolation member thus protected will remain relatively clean and of high electrical resistance; therefore the leakage currents will be significantly reduced. This is of particular importance with tie isolation members 123a of FIG. 11 which bridge the two opposite polarity support plates at the positions protected by the shield if fitted. It will be understood that the shield may be employed with any of the aforementioned embodiments of the invention.

SIXTH EMBODIMENT

There is a yet further aspect of the invention, which may be utilised with filters of the type shown in FIGS. 8A and 8B, in which all the isolation members are supported in an isolation frame 70 such that they are all in contact with this frame and leakage currents will flow as discussed above. Referring to FIG. 13A, isolation members 71a support the ground electrodes and isolation members 71b support the high voltage electrodes. Leakage currents (shown by dotted arrows 133) will flow along the isolation frame 70 over the distance between the isolation members. Referring to FIG. 13B, which is the same arrangement as in FIG. 13A, except that the length of the current path between the isolation members has been increased by the provision of slots 170 in the isolation frame 70. The current must now flow around the slot, increasing the current path length (and therefore the electrical resistance of the path) by twice the slot depth, thus reducing the leakage current. It will be understood that the use of these slots may be employed with any of the embodiments of the invention.

SEVENTH EMBODIMENT

As discussed above, it is important that the depth of the filter in the direction of airflow is kept to a minimum in certain applications, for example within the restricted space inside certain air conditioners. Placement of the isolation members on the upstream and downstream faces of the filter will increase this filter depth by twice the thickness of the isolation members. To minimise this, slots can be provided at the edges of the electrodes, forming recessed edge portions, to which the isolation members are bonded by adhesive.

Figure 14A:
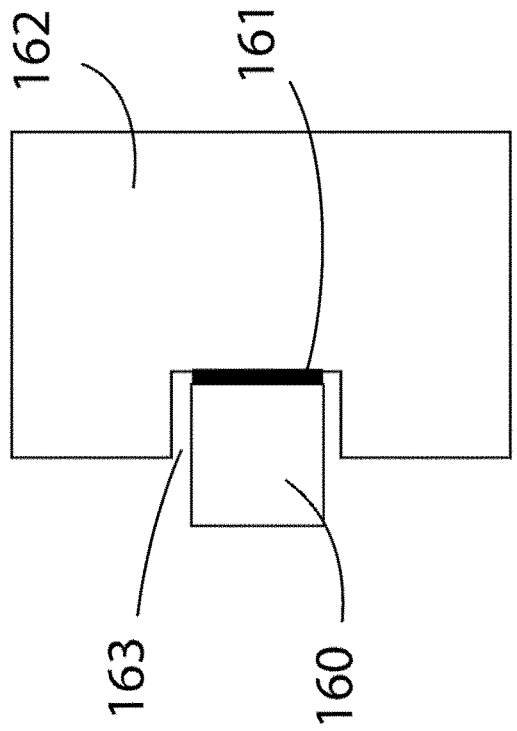
FIGS. 14A, 14B, 14C and 14D show different placements of the isolation members relative to the electrode edges, with and without slots in the electrode in accordance with a seventh embodiment of the invention.

Referring to FIG. 14A, the isolation member 160 is bonded to the edge of electrode 162 by means of adhesive 161. Slots are not provided. The isolation member thus stands proud of the electrode edge and increases the depth of the filter in the direction of airflow. It will be understood that in this arrangement and in the following arrangements shown in FIGS. 14B, 14C and 14D the isolation members may be alternatively beads of glue.

Figure 14B:
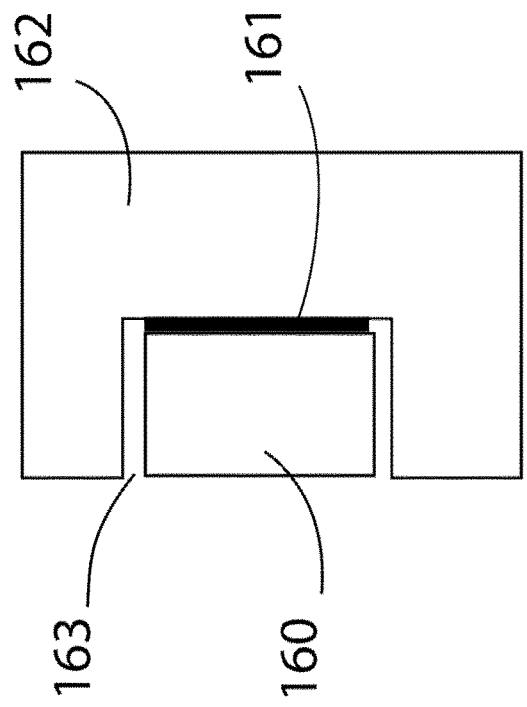

FIG. 14B shows an isolation member 160 bonded to the recessed edge of electrode 162 in the slot 163 so that the isolation member stands less proud of the face of the filter, thereby reducing the depth of the filter.

Figure 14C:
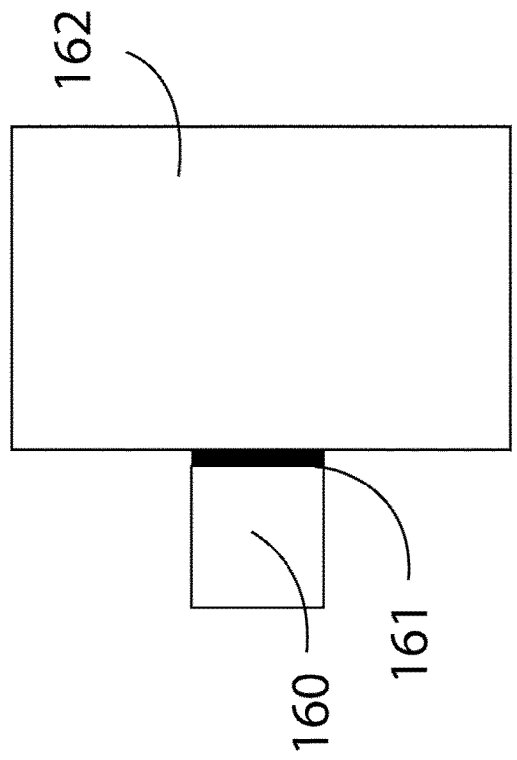

FIG. 14C shows an isolation member 160 bonded to the recessed edge of the electrode 162 with adhesive 161 so that the isolation member occupies substantially the full width of the recessed slot 163 while also reducing the depth of the filter.

Figure 14D:
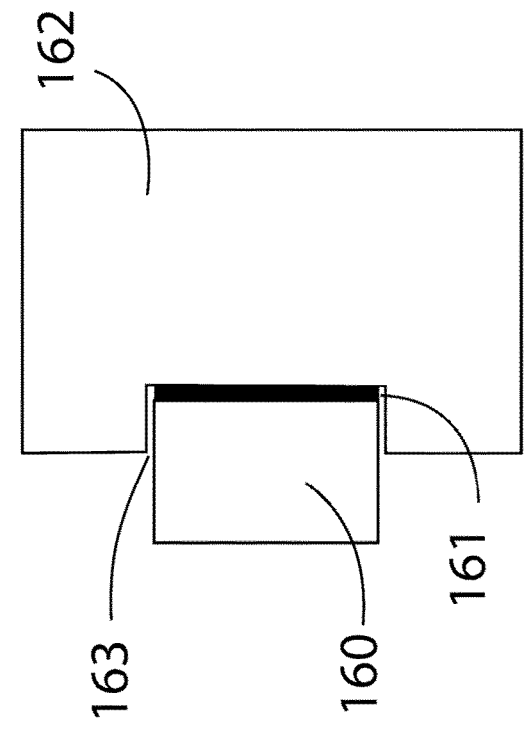

FIG. 14D shows an isolation member 160 bonded to the recessed edge of electrode 162 in the slot 163 so that the isolation member is flush with the face of the filter thus minimising the filter depth.

In all these arrangements it should be understood that the slots are provided with the sole purpose of reducing the depth of the filter and do not provide of themselves a fixing of the electrodes to the isolation members. This fixing is entirely due to the bond provided by the adhesive onto the electrode edge (recessed edge portion). No gripping of the isolation members is provided by the slots 163—bonding of the isolation members to the edge(s) of the electrodes is essential (either by an adhesive 161 or such like, or by virtue of the isolation members being formed of adhesive or such like).

In this light, it will be understood that in the notch arrangement illustrated in FIG. 14C, even if the adhesive 161 were applied to bond the isolation member 160 to the slot 163 on all three edges of the slot, the same principle of bonding applies. In other words, the fixing is entirely due to the bonding of the isolation member to the edges of the slot and not to a gripping of the isolation member by the slot itself. Indeed, with thin electrodes as employed in this invention, the electrode notches do not have the strength and rigidity of themselves to hold the electrodes in place. A filter built without bonding and relying on gripping alone would have no effective gripping and low mechanical integrity and would collapse on normal handling or when an electric field is applied.

EIGHTH EMBODIMENT

Figure 14E:
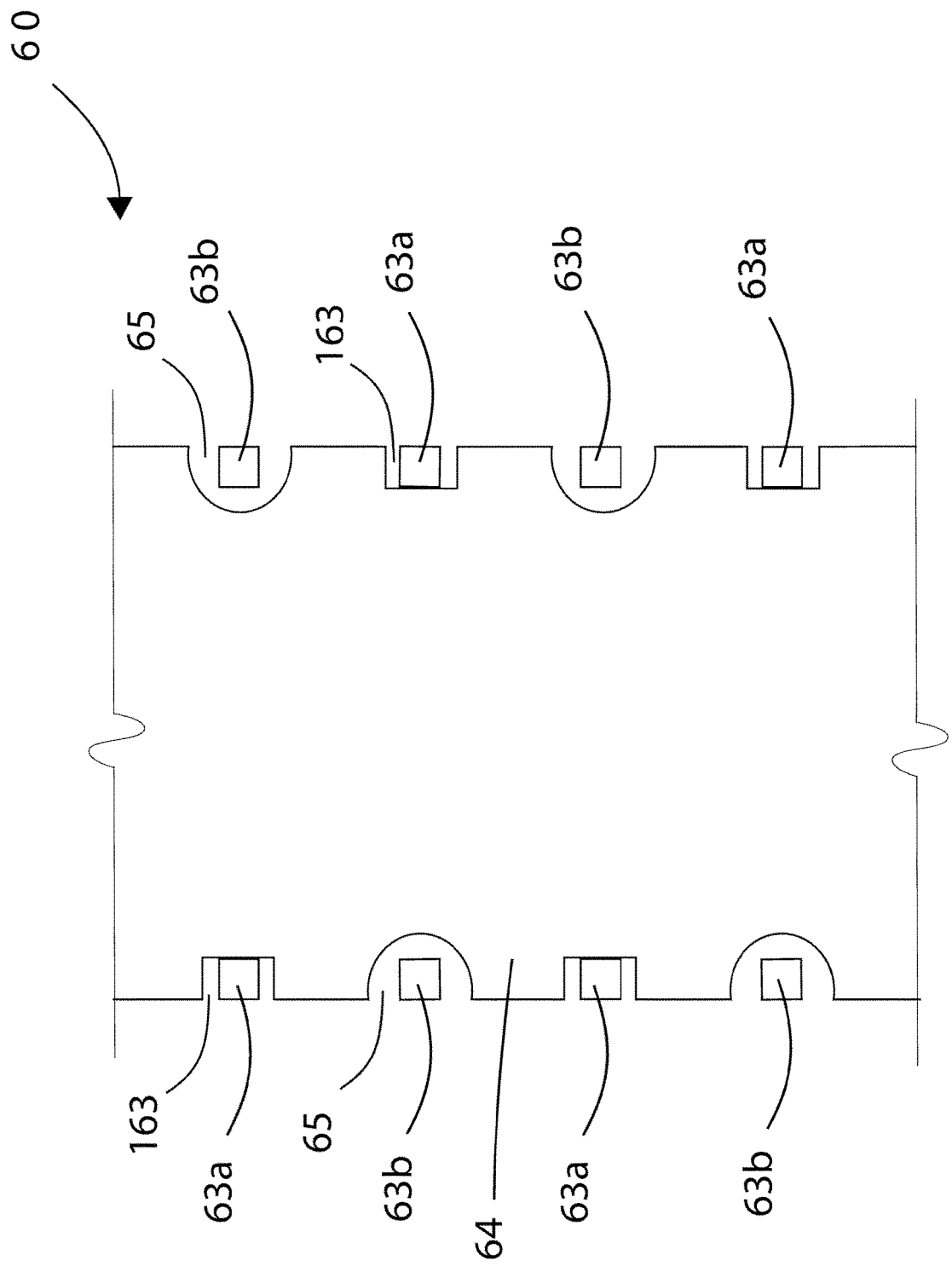
FIG. 14E is a plan view of a filter according to an eighth embodiment of the invention.

FIG. 14E shows a filter having both (a) slots within which isolation members can be bonded to the electrode in order to reduce the depth of the filter in the direction of airflow, and (b) notches to accommodate isolation members so that they do not make contact with the electrode. Referring to FIG. 14E, an electrode 64 is provided with a series of notches 65, which accommodate isolation members 63b, and slots 163, which allow the isolation members 63a supporting the electrode 64 to be bonded to the electrode edge within the slots 163 so that the isolation members are within the overall depth of the filter in the direction of airflow. The notches 65 are of sufficient depth so that the isolation members 63b are also positioned within the overall depth of the filter in the direction of airflow. This allows the filter depth to be minimized, which is an advantage when the filter is deployed where space is limited for example inside an air conditioning equipment.

Electrode Material

Although all of the specific description of the invention contained herein has been described with reference to all non-metal electrodes, there are circumstances where such a filter would not be suitable. The invention also envisages and applies to those circumstances, and thus all references to non-metal electrodes in the foregoing specific description can be replaced by reference to either all metal electrodes or a combination of metal electrodes and non-metal electrodes (interleaved between one another in a regular manner), as will be discussed in more detail below.

In particular, under conditions of elevated temperature that may be encountered by the electrode films when a filter according to the invention is operated in particular environments, such as during the filtering of hot gases, the polymeric electrode films utilized in the above embodiments of this invention may tend to soften as the polymer melting point is approached. This would lead to permanent distortion of the closely spaced electrodes under the influence of gravity and the applied electric field, which might, under certain circumstances in a hostile environment, produce points along the electrodes where the separation becomes close enough to initiate electrical discharge through the air with the disadvantages described above. In extreme cases, adjacent electrodes may touch, causing a short circuit and failure of the filter. Under these conditions, it becomes advantageous to employ metal electrodes, which will remain geometrically stable even at high temperatures. In such circumstances, isolation members can be employed made of heat resisting material, such as for example ceramics.

With metal electrodes the advantages of an edge gap between the conductive electrode surface and the edge of the electrode can be obtained by covering the outer edge of the metal electrode with a temperature resistant non-conductive coating. For the same electrode thickness, a metal electrode will be stiffer than a polymer electrode and therefore the spacing of the supporting isolation members can be increased with the result that the resulting smaller number of isolation members will provide fewer leakage paths when dirty and/or in humid air and therefore an overall reduction in undesirable leakage current will be obtained.

In addition the smaller number of isolation members will result in a reduction in weight that can to a degree offset the inevitable extra weight caused by using metal as opposed to polymer electrodes.

In the case of utilizing metal electrodes without an edge gap then a balance must be struck between the distance between electrodes and the applied voltage, particularly in high humidity conditions in order to avoid electrical breakdown through the air. For example a polymer electrode filter can operate at 0.5 mm plate spacing with an applied voltage of 1.5 kV. In contrast a metal electrode filter under same conditions would need to be operated with an applied voltage of 1 kV or lower.

A typical metal electrode in such a filter would be made of sheet metal with a thickness of 0.05 mm to 0.2 mm. Preferably the metal would be stainless steel. One advantage of stainless steel is to resist corrosion particularly under conditions of high humidity. A preferred thickness of a stainless steel electrode would be 0.1 mm.

The invention claimed is:

1. A filter for an electrostatic precipitator, said filter comprising:
    a plurality of spaced-apart, electrode films having electrical conductivity, arranged to be alternately powered at high and low electrical potentials, each of said electrode films having a leading edge, a trailing edge and two opposing side edges therebetween that extend in a direction of airflow;
    and first and second pluralities of spaced-apart, rigid isolation members bonded to each of the leading and trailing edges of the plurality of electrode films respectively, wherein each isolation member is bonded, via a substantially continuous, and substantially flat surface thereof, to at least some of said leading or trailing edges, thereby fixing the electrode films in the required spaced-apart arrangement thereof.

2. A filter as claimed in claim 1 wherein the all electrode films are metallic, all electrode films are non-metal, or some electrode films are metallic and some are non-metal.

3. A filter as claimed in claim 1 wherein a spacing between adjacent electrode films is equal to or less than 2 mm.

4. A filter as claimed in claim 1 wherein each electrode film has a thickness of equal to or less than 0.5 mm.

5. A filter as claimed in claim 1 wherein each electrode film may have a depth (the dimension in the direction of airflow) of equal to or less than 50 mm.

6. A filter as claimed in claim 2, wherein one or more of the non-metal electrode films is made from a polymeric material having electrically conductive particles therein and/or thereon.

7. A filter as claimed in claim 6 wherein one or more of the electrode films is made from carbon-loaded polypropylene.

8. A filter as claimed in claim 2, wherein one or more of the non-metal electrode films is made from a polymeric material provided with a coating, ink or paint on at least a portion of one or both of its faces.

9. A filter as claimed in claim 8 wherein the coating, ink or paint is electrically conductive or semi-conductive.

10. A filter as claimed in claim 8 wherein the coating, ink or paint is recessed from each of the leading and trailing edges of the one or more non-metal electrode films so as to form gaps between each of said edges and the coating, ink or paint.

11. A filter as claimed in claim 10 wherein a gap between the coating, ink or paint and the leading edge of a non-metal electrode film is greater than the gap between the coating, ink or paint and the trailing edge of the non-metal electrode film.

12. A filter as claimed in claim 1 wherein a series of notches is provided in each of the leading and trailing edges of the plurality of electrode films, and wherein the first and second pluralities of isolation members are bonded to said edges between said notches.

13. A filter as claimed in claim 12 wherein: (i) the notches in each leading edge are offset from the notches in the respective trailing edge, or (ii) the notches in each leading edge are directly opposite to the respective notches in the trailing edge.

14. A filter as claimed in claim 13 (ii) wherein adjacent electrode films are offset from each other such that the notches in every other electrode film are aligned with one another along each of the leading and trailing edges.

15. A filter as claimed in claim 1 wherein a series of slots is provided in each of the leading and trailing edges of the plurality of electrode films, each slot defining a recessed edge portion, and wherein the first and second pluralities of isolation members are bonded to said recessed edge portions of, and at least partially accommodated by, said slots.

16. A filter as claimed in claim 15, wherein a series of notches is provided in each of the leading and trailing edges of the plurality of electrode films, wherein the first and second pluralities of isolation members are bonded to said edges between said notches, and wherein each slot in the series of slots is provided adjacent to at least one notch in the series of notches.

17. A filter as claimed in claim 1 wherein some or all the isolation members of one or both of the first and second pluralities thereof are: (i) rods, bars, batons or sticks, or (ii) lines of rigid adhesive or resin.

18. A filter as claimed in claim 17 (i) wherein the isolation members of one or both of the first and second pluralities thereof may be held in a spaced-apart, parallel relationship by upper and/or lower isolation frame members, thereby forming a leading edge isolation frame and/or a trailing edge isolation frame.

19. A filter as claimed in claim 18 wherein a series of edge slots is provided in the upper and/or lower isolation frame members, each slot defining a recessed frame portion, and wherein the isolation members are positioned between said slots.

20. A filter as claimed in claim 1 wherein first and second pairs of rigid support plates are provided adjacent the first and last electrode films in the plurality thereof, each plate in the first pair of plates being outermost, and wherein alternate isolation members in each of the first and second pluralities thereof are bonded (a) to the first pair of rigid support plates and (b) to the second pair of rigid support plates respectively.

21. A filter as claimed in claim 20 wherein an electrode film is provided on an innermost surface of each plate in the second pair of rigid plates.

22. A filter as claimed in claim 20 wherein tie isolation members are provided, at intervals across the first and second pluralities of isolation members, each bonded to both the first and second pairs of rigid support plates.

23. A filter as claimed in claim 22 wherein the tie isolation members are provided in at least terminal positions, one at each end of both the first and second pluralities of isolation members.

24. A filter as claimed in claim 1 having first and second ends which extend parallel to the plurality of electrode films, wherein a shield is provided at one of said ends of the filter, said shield extending across end portions of the isolation members of the first plurality thereof on the upstream face of the filter.

25. A filter as claimed in claim 24 wherein the shield extends from said end portions of the isolation members of the first plurality thereof on the upstream face of the filter to corresponding end portions of the isolation members of the second plurality thereof on the downstream face of the filter.

26. A filter as claimed in claim 25 wherein: (i) the shield extends over, so as to cover, the end of the filter where it is provided, or (ii) the shield is in the form of a band that wraps around the end of the filter.

27. An electrostatic precipitator comprising a filter as claimed in claim 1.

* * * * *